(12) United States Patent
Jiang

(10) Patent No.: US 12,193,066 B2
(45) Date of Patent: *Jan. 7, 2025

(54) RANDOM ACCESS METHOD AND DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 21 days.

This patent is subject to a terminal disclaimer.

(21) Appl. No.: 17/713,290

(22) Filed: Apr. 5, 2022

(65) Prior Publication Data

US 2022/0232637 A1  Jul. 21, 2022

Related U.S. Application Data

(63) Continuation of application No. 16/759,542, filed as application No. PCT/CN2017/108285 on Oct. 30, 2017, now Pat. No. 11,330,633.

(51) Int. Cl.
*H04W 74/08* (2024.01)
*H04B 17/318* (2015.01)
(Continued)

(52) U.S. Cl.
CPC ...... *H04W 74/0833* (2013.01); *H04B 17/318* (2015.01); *H04W 36/0072* (2013.01);
(Continued)

(58) Field of Classification Search
CPC ............. H04W 76/27; H04W 74/0833; H04W 72/0453; H04W 72/21; H04W 52/50;
(Continued)

(56) References Cited

U.S. PATENT DOCUMENTS 11,224,008 B2 * 1/2022 Niu .................. H04W 74/0891
2011/0103328 A1 5/2011 Lee et al.
(Continued)

FOREIGN PATENT DOCUMENTS

CN 101547497 A 9/2009
CN 101883398 A 11/2010
(Continued)

OTHER PUBLICATIONS

ZTE et al., Discussion on SUL carrier, R2-1710899, 3GPP TSG RAN WG1 Meeting #99bis, Prague, Czech, Oct. 9-13, 2017, 6 pages.

(Continued)

*Primary Examiner* — Brian D Nguyen
(74) *Attorney, Agent, or Firm* — Finnegan, Henderson, Farabow, Garrett & Dunner, L.L.P.

(57) ABSTRACT

A random access method includes: receiving, by a terminal, a radio resource control (RRC) message sent by a base station, the RRC message comprising a power threshold; detecting, by the terminal, a reference signal received power (RSRP) of a current downlink carrier; determining, by the terminal, a first uplink carrier among a plurality of uplink carriers corresponding to the base station according to the RSRP and the power threshold; and transmitting, by the terminal, a random access preamble to the base station using the first uplink carrier. The plurality of uplink carriers comprise a supplementary uplink (SUL) carrier and a non-SUL carrier.

18 Claims, 23 Drawing Sheets

(51) Int. Cl.
  *H04W 36/00* (2009.01)
  *H04W 36/08* (2009.01)
  *H04W 72/04* (2023.01)
  *H04W 72/0453* (2023.01)
  *H04W 72/21* (2023.01)
  *H04W 74/0833* (2024.01)
  *H04W 76/27* (2018.01)

(52) U.S. Cl.
  CPC ....... *H04W 72/0453* (2013.01); *H04W 72/21* (2023.01); *H04W 76/27* (2018.02); *H04W 36/08* (2013.01)

(58) Field of Classification Search
  CPC ............. H04W 36/0072; H04W 36/08; H04W 52/245; H04W 36/0085; H04B 17/318
  See application file for complete search history.

(56) References Cited

U.S. PATENT DOCUMENTS

| | | | |
|---|---|---|---|
| 2015/0215829 | A1 | 7/2015 | Chang et al. |
| 2016/0302225 | A1 | 10/2016 | Damnjanovic et al. |
| 2016/0353387 | A1 | 12/2016 | Gao et al. |
| 2018/0227838 | A1* | 8/2018 | Hayashi ............... H04W 72/23 |
| 2019/0045460 | A1* | 2/2019 | Muruganathan ..... H04B 7/0617 |
| 2019/0053080 | A1* | 2/2019 | Ryu ....................... H04W 76/27 |
| 2019/0215759 | A1* | 7/2019 | Wei ................... H04W 74/0833 |
| 2020/0037345 | A1* | 1/2020 | Ryoo ................. H04W 72/1268 |
| 2020/0084682 | A1* | 3/2020 | Wang .................... H04W 92/20 |
| 2020/0084805 | A1* | 3/2020 | Li ............................ H04W 72/23 |
| 2020/0100300 | A1 | 3/2020 | Xie et al. |
| 2020/0162211 | A1* | 5/2020 | Wang .................... H04W 72/27 |
| 2020/0229180 | A1 | 7/2020 | Liu et al. |
| 2020/0245200 | A1* | 7/2020 | Xiong .................... H04B 7/0626 |
| 2020/0264636 | A1* | 8/2020 | Zhang ..................... G05D 1/106 |
| 2021/0100042 | A1 | 4/2021 | Agiwal et al. |
| 2021/0153199 | A1* | 5/2021 | Wong ........................ H04L 5/14 |
| 2021/0160717 | A1* | 5/2021 | Ryu ........................ H04W 72/21 |
| 2021/0281552 | A1 | 9/2021 | Van Der Velde et al. |
| 2022/0417923 | A1* | 12/2022 | Uchiyama ............... H04W 4/40 |

FOREIGN PATENT DOCUMENTS

| | | |
|---|---|---|
| CN | 101998577 A | 3/2011 |
| CN | 102014422 A | 4/2011 |
| CN | 102281571 A | 12/2011 |
| CN | 102396280 A | 3/2012 |
| CN | 103037441 A | 4/2013 |
| CN | 103369611 A | 10/2013 |
| WO | WO 2016/164465 A1 | 10/2016 |

OTHER PUBLICATIONS

Huawei et al., Remaining issues on the PRACH for SUL, R1-1717901, 3GPP TSG RAN WG1 Meeting 90bis, Praque, Czech Republic, Oct. 9-13, 2017, 5 pages.

International Search Report in the International Application No. PCT/CN2017/108285, mailed on Jul. 25, 2018.

English translation of the Written Opinion of the International Search Authority in the International Application No. PCT/CN2017/108285, mailed on Jul. 25, 2018.

First Office Action dated Sep. 15, 2021, from the State Intellectual Property Office of the People's Republic of China, issued in Chinese Application No. 201780003578.4.

Second Office Action of Chinese Application No. 201780003578.4, issued on Apr. 26, 2022.

3GPP TSG RAN WG1 Meeting #99bis R2-1711841, Prague, Czech, Oct. 9-13, 2017, Revision of R2-1710899, Title: Discussion on SUL carrier, Source: ZTE, Sanechips, Agenda Item: 10.2.7, Document for: Discussion and Decision., 6 pages.

* cited by examiner

RANDOM ACCESS METHOD AND DEVICE

CROSS-REFERENCE TO RELATED APPLICATIONS

This application is a continuation application of U.S. patent application Ser. No. 16/759,542 filed on Apr. 27, 2020, now issued as U.S. Pat. No. 11,330,633, which is a national phase application of PCT Application No. PCT/CN2017/108285, filed on Oct. 30, 2017, the disclosures of which are incorporated herein by reference in their entireties.

TECHNICAL FIELD

The disclosure relates to the technical field of communications, and particularly to a random access method and device.

BACKGROUND

Over the past about 30 years, the mobile communications have evolved from a second-generation (2G) mobile communication network to a fifth-generation (5G) mobile communication network by leaps and bounds. In research discussions of the 5G project, supplementary uplink (SUL) is introduced in a cell to support uplink information of multiple terminal devices, thus enhancing an uplink coverage in the cell.

In related arts, if a cell that user equipment (UE) accesses is configured only with one uplink carrier and one downlink carrier, the UE can transmit a random access preamble through the uplink carrier to initiate a random access when performing the random access. However, if the cell that the UE accesses is configured with an SUL carrier, the cell includes two uplink carriers. i.e., one SUL carrier and one non-SUL carrier. In the latter case, the UE cannot determine on which uplink carrier to initiate a random access process when performing a random access.

SUMMARY

Random access methods, communication devices and computer-readable storage mediums are provided in embodiments of the disclosure. The technical solutions are described as below.

A first aspect according to the embodiments of the disclosure provides a random access method applied to a terminal. The method includes: receiving, by a terminal, a radio resource control (RRC) message sent by a base station, the RRC message comprising a power threshold; detecting, by the terminal, a reference signal received power (RSRP) of a current downlink carrier; determining, by the terminal, a first uplink carrier among a plurality of uplink carriers corresponding to the base station according to the RSRP and the power threshold; and transmitting, by the terminal, a random access preamble to the base station using the first uplink carrier. The plurality of uplink carriers comprise a supplementary uplink (SUL) carrier and a non-SUL carrier.

A second aspect according to the embodiments of the disclosure provides a random access method applied to a base station. The method includes: transmitting, by a base station, a radio resource control (RRC) message to a terminal, the RRC message comprising a power threshold; and receiving, by the base station, a random access preamble sent by the terminal using a first uplink carrier. The first uplink carrier is determined by the terminal among a plurality of uplink carriers corresponding to the base station according to a reference signal received power (RSRP) of a current downlink carrier and the power threshold. The plurality of uplink carriers comprise a supplementary uplink (SUL) carrier and a non-SUL carrier.

A third aspect according to the embodiments of the disclosure provides a terminal device, which includes a processor, and a memory configured to store instructions executable by the processor. The processor is configured to: receive a radio resource control (RRC) message sent by a base station, the RRC message comprising a power threshold; detect a reference signal received power (RSRP) of a current downlink carrier; determine a first uplink carrier among a plurality of uplink carriers corresponding to the base station according to the RSRP and the power threshold; and transmit a random access preamble to the base station using the first uplink carrier. The plurality of uplink carriers comprise a supplementary uplink (SUL) carrier and a non-SUL carrier.

A fourth aspect according to the embodiments of the disclosure provides a base station, which includes a processor and a memory configured to store instructions executable by the processor. The processor is configured to perform the method in the second aspect.

A fifth aspect according to the embodiments of the disclosure provides a non-transitory computer-readable storage medium having stored thereon instructions that, when executed by a processor of a terminal device, cause the terminal device to perform the method in the first aspect.

A sixth aspect according to the embodiments of the disclosure provides a non-transitory computer-readable storage medium having stored thereon instructions that, when executed by a processor of a base station, cause the base station to perform the method in the second aspect.

It should be understood that the general description above and the following detailed description in the disclosure are merely exemplary and explanatory and are not intended to limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The technical solutions provided by the embodiments of the disclosure relate to a terminal device and a base station that are connected to each other via a mobile communication network. The terminal can be a cell phone, a tablet, a smart watch and other device with functions of mobile communication, and there are no limits made in the embodiments of the disclosure. In related art, if a cell accessed by a terminal device is configured with an SUL carrier, the cell includes two uplink carriers, i.e., one SUL carrier and one non-SUL carrier. As a result, the terminal device cannot determine on which uplink carrier to initiate a random access process when the random access is performed. In the technical solutions provided by the embodiments of the disclosure, the terminal device can determine a first target uplink carrier used for transmitting a random access preamble among a plurality of uplink carriers corresponding to a target base station, and transmit a random access preamble to the target base station using the first target uplink carrier to initiate a random access, so that the random access is implemented in cells configured with the SUL carrier, thus the success rate of the random access is increased.

In the embodiments of the disclosure, a random access method is provided, and an execution subject of the method includes a terminal device and a base station. Two sets of embodiments are arranged in the disclosure depending on execution subjects of the methods, which are described as follows.

Terminal Device Side

Figure 1A:
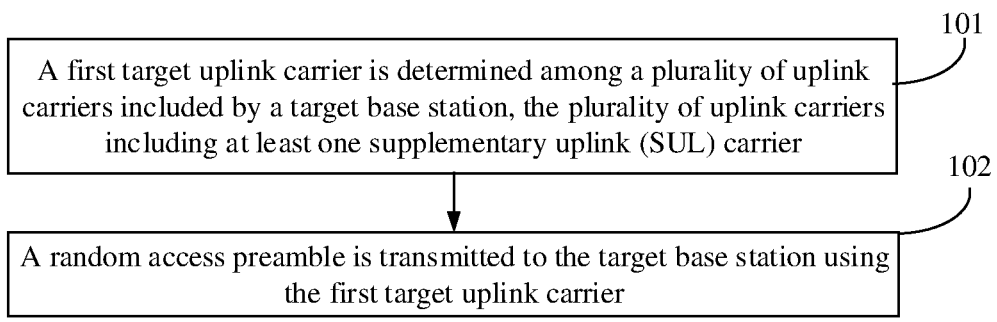
FIG. 1A is a flowchart illustrating a random access method according to an exemplary embodiment.

FIG. 1A is a flowchart illustrating a random access method according to an exemplary embodiment, herein the method is applied to the terminal device. As illustrated in FIG. 1A, the method includes following operations 101 and 102.

In operation 101, a first target uplink carrier is determined among a plurality of uplink carriers corresponding to a target base station, the plurality of uplink carriers including at least one supplementary uplink (SUL) carrier.

Exemplarily, the plurality of uplink carriers corresponding to the target base station can include at least one SUL carrier and one non-SUL carrier, herein the non-SUL carrier is usually a carrier in a high frequency band and the SUL carrier is usually a carrier in a low frequency band. In the embodiments of the disclosure, a target base station will be described as an example, herein the target base station includes: two uplink carriers including one SUL carrier and one non-SUL carrier, and a downlink carrier paired with the two uplink carriers.

The target base station performs system broadcasting according to a preset time interval. herein a system broadcasting message can include a carrier identifier of the SUL carrier, a carrier identifier of a non-SUL carrier and a carrier identifier of a downlink carrier. If an uplink carrier paired with the downlink carrier is pre-agreed between the terminal device and the target base station agree, the system broadcasting message can merely include the carrier identifier of the SUL carrier and the carrier identifier of the downlink carrier. In this case, the terminal device can obtain the carrier identifier of another non-SUL carrier paired with the downlink carrier according to the agreement after receiving the system broadcasting message. Or, if a downlink carrier paired with the uplink carrier is pre-agreed between the terminal device and the target base station, the system broadcasting message can merely include the carrier identifier of the SUL carrier and the carrier identifier of the non-SUL carrier. In this case, the terminal device can obtain the carrier identifier of the downlink carrier paired with the non-SUL carrier according to the agreement after receiving the system broadcasting message. The carrier identifier can be an identity (ID) of the carrier pre-agreed between the terminal and the target base station; or if the frequencies of the two uplink carriers and the downlink carrier are different from each other, the carrier identifier can also be the frequency of each carrier. There are no limits made in the embodiments of the disclosure.

According to an embodiment of the disclosure, the terminal device can monitor the system broadcasting message of the target base station and access the target base station according to the system broadcasting message. During an interaction process between the terminal device and the target base station, the target base station usually configures a physical uplink control channel (PUCCH) on an uplink carrier with a better signal quality to ensure a good communication quality of the PUCCH, namely the reliability in transmission of a control signaling, thus the terminal can determine, as a first target uplink carrier, a carrier configured with the PUCCH among the plurality of uplink carriers corresponding to the target base station and transmit a random access preamble using the determined carrier, thereby improving the reliability in transmission of the random access preamble. For example, if the target base station configures the PUCCH on the SUL carrier, the terminal device can determine the SUL carrier as the first target uplink carrier; if the target base station configures the PUCCH on the non-SUL carrier, the terminal can determine the non-SUL carrier as the first target uplink carrier; if the target base station configures that the PUCCH can be dynamically regulated on the SUL carrier and the non-SUL carrier, then based on a time when the random access is initiated, the terminal device can also determine, as the first target uplink carrier, the SUL carrier or the non-SUL carrier which is configured with the PUCCH at the time when the random access is initiated.

According to an embodiment of the disclosure, the terminal device can also obtain a random access resource included by each of the plurality of uplink carriers respectively and determine the first target uplink carrier according to the random access resource included by each uplink carrier. For example, the terminal device can obtain the random access resources included by the SUL carrier and the non-SUL carrier respectively, and then obtain, a carrier where the earliest-arriving random access resource is on, as the first target uplink carrier according to the time when the random access is initiated, herein the earliest-arriving random access resource is a resource that arrives at a time closest to the time when the random access is initiated.

In operation 102, the random access preamble is transmitted to the target base station using the first target uplink carrier.

Exemplarily, after the first target uplink carrier for transmitting the random access preamble is determined among the plurality of uplink carriers, the terminal device can transmit the random access preamble to the target base station using the first target uplink carrier. Specifically, the terminal device can transmit the random access preamble using a preset first transmitting power and wait to receive random access response information from the target base station. if the random access response information is not received from the target base station in a second preset period, the terminal device can continue to transmit the random access preamble on the first target uplink carrier using a preset second transmitting power and re-initiate the random access. Or, the terminal device can determine a second target uplink carrier, other than the first target uplink carrier, among the plurality of uplink carriers, and transmit the random access preamble using the second target uplink carrier.

In the technical solutions provided by the embodiments of the disclosure, a terminal device can determine a first target uplink carrier used for transmitting a random access preamble among a plurality of uplink carriers corresponding to a target base station, and transmit a random access preamble to the target base station using the first target uplink carrier to initiate a random access, so that the random access is implemented in cells configured with the SUL carrier, thus the success rate of the random access is increased.

Figure 1B:
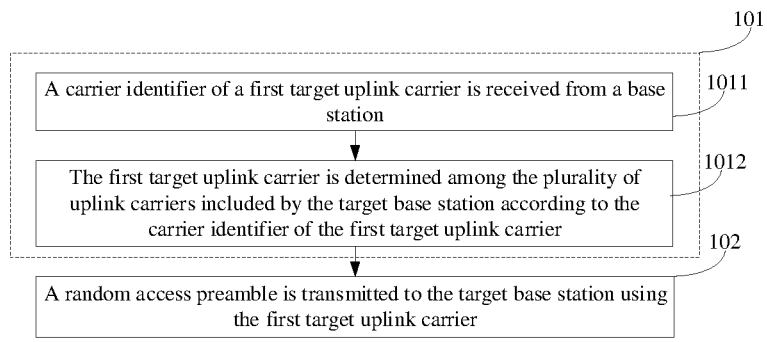
FIG. 1B is a flowchart illustrating a random access method according to an exemplary embodiment.

In an embodiment of the disclosure, as illustrated in FIG. 1B, determining a first target uplink carrier among a plurality of uplink carriers corresponding to a target base station can be implemented by operations 1011 and 1012.

In operation 1011, a carrier identifier of the first target uplink carrier is received from a base station.

In operation 1012, the first target uplink carrier is determined among the plurality of uplink carriers corresponding to the target base station according to the carrier identifier of the first target uplink carrier.

Exemplarily, when determining that the terminal device needs to initiate a random access, the target base station can determine the first target uplink carrier configured for the terminal device to transmit the random access preamble among the plurality of uplink carriers corresponding to the target base station and transmit the carrier identifier of the first target uplink carrier to the terminal device. After receiving the carrier identifier of the first target uplink carrier from the target base station, the terminal device can obtain, as the first target uplink carrier, an uplink carrier with a carrier identifier same as the carrier identifier of the first target uplink carrier, among the plurality of uplink carrier.

The carrier identifier of the first target uplink carrier can be: a carrier name of the first target uplink carrier, i.e., an SUL carrier or a non-SUL carrier; or an ID of the first target uplink carrier pre-agreed between the terminal device and the target base station; or a carrier index number, i.e., the index number of each uplink carrier pre-agreed between the terminal and the base station, when the target base station transmit the carrier identifier of the first target uplink carrier, it can directly transmit the index number of the first target uplink carrier. If frequencies of the plurality of uplink carriers corresponding to the target base station are different from each other, the carrier identifier of the first target uplink carrier can also be a carrier frequency of the first target uplink carrier.

Figure 1C:
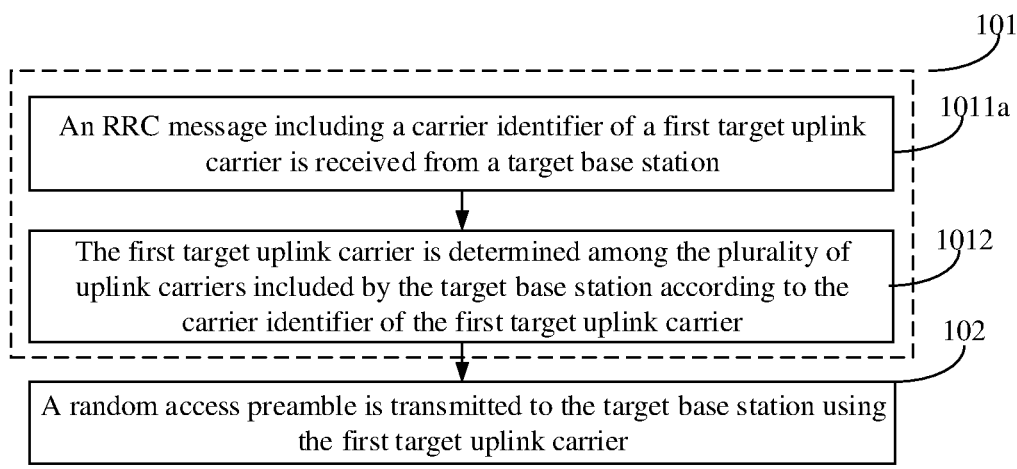
FIG. 1C is a flowchart illustrating a random access method according to an exemplary embodiment.

In an embodiment of the disclosure, as illustrated in FIG. 1C, the operation 1011 of receiving a carrier identifier of the first target uplink carrier can be implemented by operation 1011a.

In operation 1011a, an RRC message including the carrier identifier of the first target uplink carrier is received from a target base station.

Exemplarily, the RRC message is information transmitted by the target base station to regulate and control resource configuration. After the terminal device accesses the target base station, before configuring other uplink resource or other downlink resource for the terminal device using the RRC message, the target base station can configure a carrier used for initiating a random access for the terminal device in advance, thereby avoiding a failure in a random access caused by a situation that the terminal device cannot determine a carrier used to upload the random access preamble when initiating the random access.

With two uplink carriers, i.e., one SUL carrier and one non-SUL carrier, included by the target base station as an example, the target base station can determine random access resources included by the SUL carrier and the non-SUL carrier first, and then determine, according to the random access resources included by the SUL carrier and the non-SUL carrier, the first target uplink carrier configured for the terminal device to initiate the random access, and notify the terminal device of the carrier identifier of the first target uplink carrier by including the carrier identifier of the first target uplink carrier in the RRC message transmitted to the terminal device. After receiving the RRC message, the terminal device can obtain a first carrier identifier included in the RRC message and determine, as the first target uplink carrier, a carrier with a carrier identifier same as the first carrier identifier among the SUL carrier and the non-SUL carrier. In the embodiments of the disclosure, the carrier identifier of the first target uplink carrier, which is included in the RRC message, is designated as the first carrier identifier for the purpose of easy differentiation.

Specifically, a first function field can be added in the RRC message in advance and pre-agreed between two sides: the terminal device and the target base station. After obtaining the first target uplink carrier, the target base station can write the first function field in the carrier identifier of the first target uplink carrier. After receiving the RRC message, the terminal device can parse the first function field to obtain the first carrier identifier and determine, as the first target uplink carrier, a carrier that is in the SUL carrier and the non-SUL carrier included by the target base station and corresponds to the first carrier identifier.

In the technical solutions provided in the embodiments of the disclosure, the terminal device can determine, according to the configuration of the target base station, the first target uplink carrier used for transmitting the random access preamble among the plurality of uplink carriers corresponding to the target base station, and transmit the random access preamble to the target base station using the first target uplink carrier to initiate the random access, so that the random access is implemented in cells configured with the SUL carrier, thus the success rate of the random access is increased.

Figure 1D:
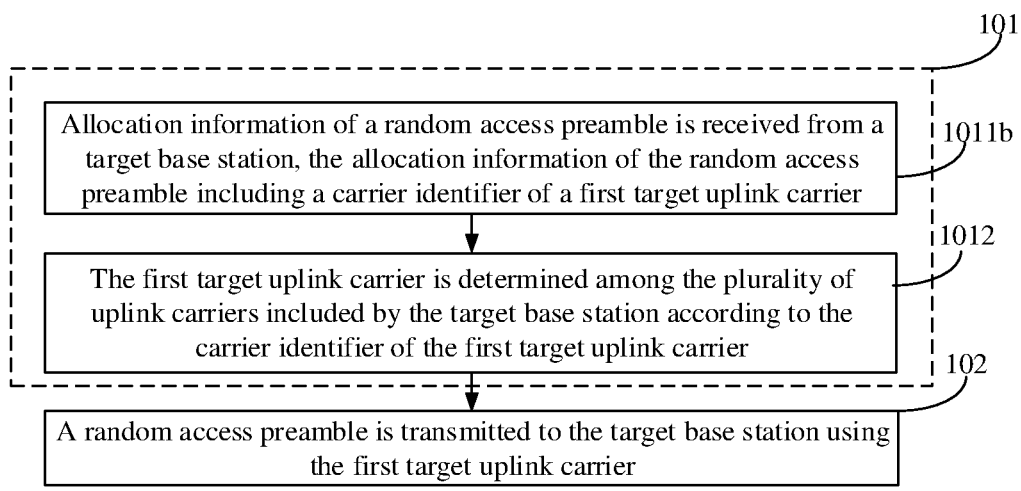
FIG. 1D is a flowchart illustrating a random access method according to an exemplary embodiment.

In an embodiment of the disclosure, as illustrated in FIG. 1D, the operation 1011 of receiving a carrier identifier of a first target uplink carrier from the base station can be implemented by operation 1011b.

In operation 1011b, allocation information of a random access preamble is received from the target base station, the allocation information of the random access preamble including the carrier identifier of the first target uplink carrier.

Exemplarily, the random access includes a competitive random access and a non-competitive random access. When triggering the non-competitive random access using a physical downlink control channel (PDCCH) command, the target base station can allocate the random access preamble to the terminal device according to a preset rule, and obtain, a carrier where the PDCCH is on among a plurality of uplink carriers, as the first target uplink carrier configured for the terminal device to transmit the random access preamble; the target base station can then generate the allocation information of the random access preamble according to the random access preamble and the carrier identifier of the first target uplink carrier, and transmit the allocation information of the random access preamble to the terminal device. In the embodiments of the disclosure, the carrier identifier of the first target uplink carrier, which is included in the allocation information of the random access preamble, is designated as a second carrier identifier for the purpose of easy differentiation.

After receiving the allocation information of the random access preamble, the terminal device can obtain the second carrier identifier included by the allocation information of the random access preamble, and obtain a carrier with a carrier identifier same as the second carrier identifier among the plurality of uplink carriers corresponding to the target base station, and the carrier is then first target uplink carrier configured for the terminal device to transmit the random access preamble by the target base station. At this time, the terminal device can initiate the random access using the first target uplink carrier to transmit the random access preamble allocated by the target base station to the terminal device.

In a practical application, a function field can be added in the allocation information of the random access preamble to carry the carrier identifier of the first target uplink carrier.

In the technical solutions provided in the embodiments of the disclosure, the terminal device can determine, according to an advance configuration of the target base station, the first target uplink carrier used for transmitting the random access preamble among the plurality of uplink carriers corresponding to the target base station, and transmit the random access preamble to the target base station using the first target uplink carrier to initiate the random access, so that the random access is implemented in cells configured with the SUL carrier, thus the success rate of the random access is increased.

Figure 1E:
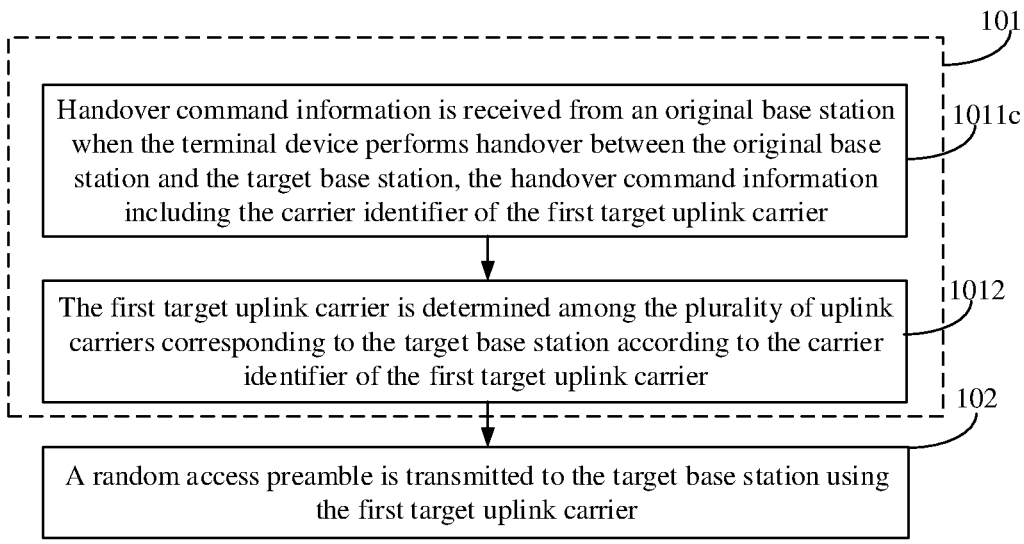
FIG. 1E is a flowchart illustrating a random access method according to an exemplary embodiment.
Figure 1F:
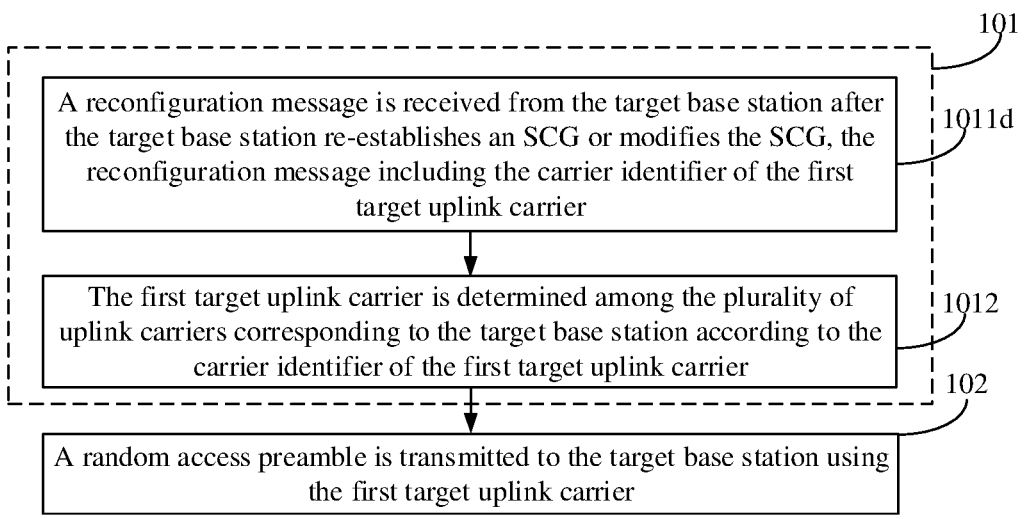
FIG. 1F is a flowchart illustrating a random access method according to an exemplary embodiment.

In an embodiment of the disclosure, as illustrated in FIG. 1E, the operation 1011 of receiving a carrier identifier of a first target uplink carrier transmitted by a base station can be implemented by operation 1011*c*.

In operation 1011*c*, handover command information is received from an original base station when the terminal device performs handover between the original base station and the target base station, the handover command information including the carrier identifier of the first target uplink carrier.

Exemplarily, two uplink carriers, i.e., an SUL carrier and a non-SUL carrier, included by the target base station will be described as an example. When being used, the terminal device may perform the handover to the target base station. When detecting that the terminal device needs to perform the handover to the target base station, the original base station which the terminal device accesses currently can transmit a handover request to the target base station which the terminal device is about to access; after receiving the handover request, the target base station can obtain, a carrier where the PDCCH is on among the SUL carrier and the non-SUL carrier, as the first target uplink carrier configured for the terminal device to transmit the random access preamble, generate handover request response information according to the carrier identifier of first target uplink carrier, and transmit the handover request response information to the original base station. In a practical application, the handover request response information can also include the carrier identifier of the SUL carrier and carrier identifier of the non-SUL carrier. The original base station can generate, according to the handover request response information, the handover command information including the carrier identifier of the SUL carrier, the carrier identifier of the non-SUL carrier and the carrier identifier of the first target uplink carrier, and transmit the handover command information to the terminal device. In the embodiments of the disclosure, the carrier identifier of the first target uplink carrier, which is included in the handover command information, is designated as a third carrier identifier for the purpose of differentiation.

After receiving the handover command information from the original base station, the terminal device obtains, a carrier with a carrier identifier same as the third carrier identifier among the SUL carrier and the non-SUL carrier, as a carrier for transmitting the random access preamble, herein the carrier is the first target uplink carrier configured for the terminal device by the target base station.

Specifically, a fourth function field can be set in the handover request response information in advance and pre-agreed between two sides: the original base station and the target base station. The target base station can write the carrier identifier of the first target uplink carrier into the fourth function field and the original base station can obtain the carrier identifier of the first target uplink carrier by parsing information in the fourth function field after receiving the handover request response information. In the same way, a fifth function field can be configured in the handover command information and is located in mobility control information of the handover command information and pre-agreed between the two sides: the original base station and the terminal device. The original base station can write the carrier identifier of the first target uplink carrier into the fifth function field and after receiving the handover command information, the terminal device can obtain a fourth carrier identifier by parsing information of the fifth function field and the fourth carrier identifier can be carrier identifier of the first target uplink carrier configured for the terminal device by the target base station.

In the technical solutions provided in the embodiments of the disclosure, when being able to performing handover to the target base station, the terminal device can determine, according to an advance configuration of the target base station, the first target uplink carrier used for transmitting the random access preamble among the plurality of uplink carriers corresponding to the target base station, and transmit the random access preamble to the target base station using the first target uplink carrier to initiate a random access, so that the random access is implemented in cells configured with the SUL carrier, thus the success rate of the random access is increased.

In an embodiment of the disclosure, as illustrated in FIG. the operation 1011 of receiving a carrier identifier of a first target uplink carrier from the base station can be implemented by operation 1011*d*.

In operation 1011*d*, a reconfiguration message is received from the target base station after the target base station re-establishes a secondary cell group (SCG) or modifies the SCG, the reconfiguration message including the carrier identifier of the first target uplink carrier.

Exemplarily, the target base station may re-establish or modify the SCG in the cells and may reconfigure a carrier used for transmitting a random access preamble for a terminal device after re-establishing or modifying the SCG because different SCGs maintain different resources. According to an embodiment of the disclosure, after re-establishing or modifying the SCG, the target base station obtains, among a plurality of uplink carriers, a carrier where a current PDCCH is on, as the first target uplink carrier configured for the terminal device to transmit the random access preamble. Because after the target base station re-establishes or modifies the SCG, it needs to transmit a reconfiguration message to the terminal device and notifies the terminal device of a latest resource configuration situation so that the carrier identifier of the first target uplink carrier can be carried in the reconfiguration message to be transmitted to the terminal device. In the embodiments of the disclosure, the carrier identifier of the first target uplink carrier, which is included in the reconfiguration message, is designated as a fourth carrier identifier for the purpose of differentiation.

After receiving the reconfiguration message, the terminal device can obtain the fourth carrier identifier included in the reconfiguration message, and obtain, a carrier with a carrier identifier same as the fourth carrier identifier among the plurality of uplink carriers, as a carrier for transmitting the random access preamble, herein the carrier is the first target uplink carrier configured for the terminal device by the target base station.

Specifically, a sixth function field can be set in the reconfiguration message and is located in the SCG of mobility control information and pre-agreed between the two sides: the terminal device and the target base station. When transmitting the reconfiguration message, the target base station can write the carrier identifier of the first target uplink carrier into the sixth function field and after receiving the reconfiguration message, the terminal device can obtain the fourth carrier identifier by parsing information of the sixth function field and then the fourth carrier identifier is the carrier identifier of the first target uplink carrier.

In the technical solutions provided in the embodiments of the disclosure, after the target base station re-establishes or modifies the SCG, the terminal device can determine, according to an advance configuration of the target base station, the first target uplink carrier used for transmitting the random access preamble among the plurality of uplink carriers corresponding to the target base station, and transmit the random access preamble to the target base station using the first target uplink carrier to initiate a random access, so that the random access is implemented in cells configured with the SUL carrier, thus the success rate of the random access is increased.

Figure 1G:
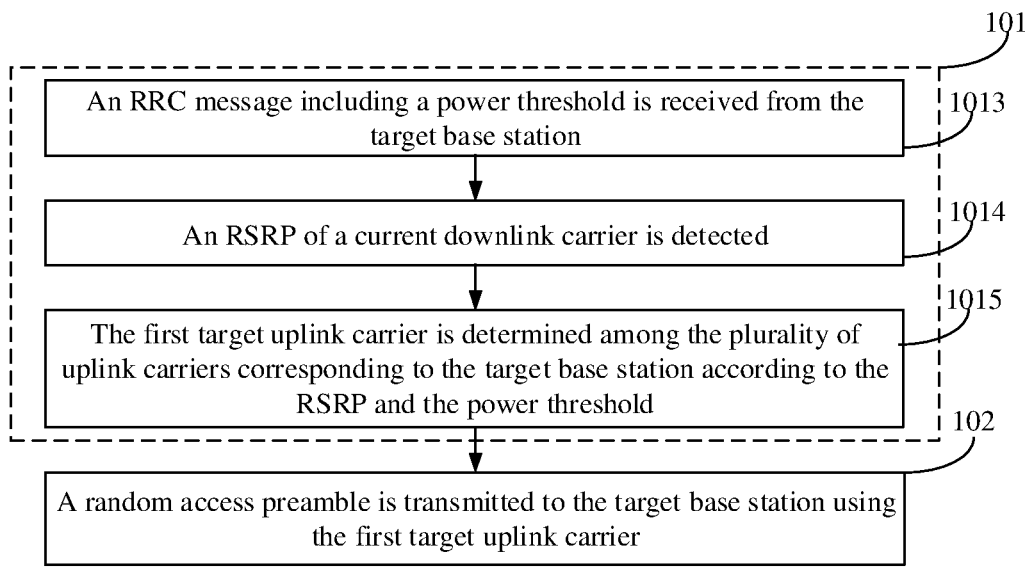
FIG. 1G is a flowchart illustrating a random access method according to an exemplary embodiment.

In an embodiment of the disclosure, as illustrated in FIG. 1G, the operation 101 of determining a first target uplink carrier among a plurality of uplink carriers corresponding to a target base station can be implemented by operations 1013 to 1015.

In operation 1013, an RRC message including a power threshold is received from the target base station.

In operation 1014, a reference signal receiving power (RSRP) of a current downlink carrier is detected.

In operation 1015, the first target uplink carrier is determined among the plurality of uplink carriers corresponding to the target base station according to the RSRP and the power threshold.

The target base station includes a plurality of uplink carriers and one downlink carrier. During initialization, the target base station can test a value of an attenuation limit of the downlink carrier corresponding to each uplink carrier when a location of the terminal device remains unchanged. With a reference uplink carrier as an example, when a current location of the terminal device remains unchanged, the target base station can test a relationship between an attenuation degree of the downlink carrier and an attenuation degree of the reference uplink carrier, and determine the value of the attenuation limit of the downlink carrier corresponding to the reference uplink carrier. If the attenuation of the downlink carrier is greater than the value of the attenuation limit, the attenuation of the reference uplink carrier is excessively great and information is not able to be transmitted to the target base station effectively; if the attenuation of the downlink carrier is less than or equal to the value of the attenuation limit, the attenuation of the reference uplink carrier is small and reliability of uplink information can be ensured. The reference uplink carrier is any one of the plurality of uplink carriers.

The target base station can divide cells it covers into several regions, determine the value of the attenuation limit of the downlink carrier corresponding to each uplink carrier when the terminal device is in different regions and store the value of the attenuation limit of the downlink carrier corresponding to each uplink carrier according to each region. After the terminal device accesses the target base station, the target base station can obtain the value of the attenuation limit of the downlink carrier corresponding to each uplink carrier in the region where the terminal device is located, determine the power threshold according to the value of the attenuation limit and notifies the terminal device of the power threshold by an RRC message, so that the terminal device can determine, in the region, the first target uplink carrier according to the power threshold and the RSRP of the current downlink carrier.

With two uplink carriers, i.e., one SUL carrier and one non-SUL, included by the target base station as an example, it is assumed that in a current region where the terminal device is located, the value of the attenuation limit of the downlink carrier corresponding to the non-SUL carrier is 30 dB and the value of the attenuation limit of the downlink carrier corresponding to the SUL carrier is 50 dB. That is to say, when the attenuation of the downlink carrier is 50 dB, the SUL carrier can still ensure reliable data transmission, whereas when the attenuation of the downlink carrier is greater than 30 dB, the non-SUL carrier cannot ensure the reliability of uplink data. As a result, the target base station can set the power threshold of the terminal device in the current region as 70 dB according to the value of the attenuation limit of the downlink carrier corresponding to the non-SUL carrier, which means that when the RSRP of the received downlink carrier is less than 70 dB, the attenuation of the downlink carrier is greater than 30 dB and when the RSRP of the received downlink carrier is greater than or equal to 70 dB, the attenuation of the downlink carrier is less than or equal to 30 dB. Then the target base station can notify the terminal device by the RRC message. The terminal device stores the power threshold, and when the random access is needed to be initiated, the terminal device first detects the RSRP of the current downlink carrier, which shows the attenuation degree of the downlink carrier, and then determines a value relationship between the RSRP and the power threshold. Specifically, the non-SUL carrier is determined as the first target uplink carrier when the RSRP is greater than or equal to the power threshold, i.e., the RSRP is greater than or equal to 70 dB; the SUL carrier is determined as the first target uplink carrier when the RSRP is less than the power threshold, i.e., the RSRP is less than 70 dB.

Specifically, a second function field can be added in the RRC message in advance and pre-agreed between the two sides: the terminal device and the target base station. After obtaining the power threshold, the target base station can write the power threshold into the second function field. The terminal device can obtain the power threshold by parsing the second function field after receiving the RRC message.

In the technical solutions provided in the embodiments of the disclosure, the terminal device can determine, according to a receiving power of a reference signal of the downlink carrier and the power threshold configured in advance by the target base station, the first target uplink carrier for transmitting a random access preamble among the plurality of uplink carriers corresponding to the target base station, and transmit the random access preamble to the target base station using the first target uplink carrier to initiate a random access, so that the random access is implemented in cells configured with the SUL carrier, thus the success rate of the random access is increased.

Figure 1H:
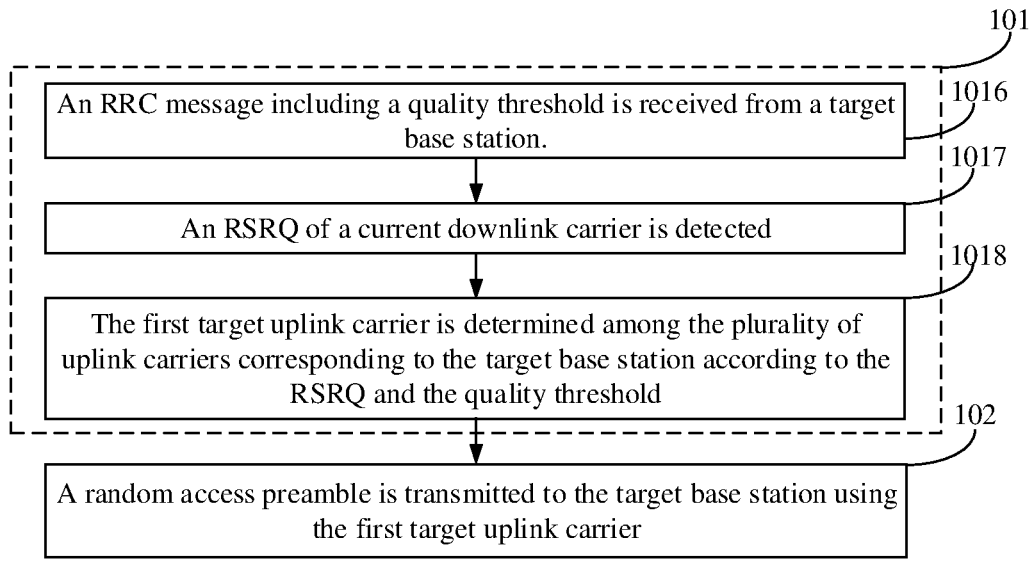
FIG. 1H is a flowchart illustrating a random access method according to an exemplary embodiment.

In an embodiment of the disclosure, as illustrated in the FIG. 1H, the operation 101 of determining a first target uplink carrier among a plurality of uplink carriers corresponding to a target base station can be implemented by operations 1016 to 1018.

In operation 1016, an RRC message including a quality threshold is received from the target base station.

In operation 1017, a reference signal receiving quality (RSRQ) of a current downlink carrier is detected.

In operation 1018, the first target uplink carrier is determined among the plurality of uplink carriers corresponding to the target base station according to the RSRQ and the quality threshold.

The target base station includes a plurality of uplink carriers and one downlink carrier. During initialization, the target base station can test a value of a quality limit of the downlink carrier corresponding to each uplink carrier when a location of the terminal device remains unchanged. With a reference uplink carrier as an example, when a current location of the terminal device remains unchanged, the target base station can test a relationship between the RSRQ of the downlink carrier and the RSRQ of the reference uplink carrier and determine the value of the quality limit of the downlink carrier. If the RSRQ of the downlink carrier is greater than or equal to the value of the quality limit, it means the reference uplink carrier has a better quality at this time and reliability of uplink information can be ensured; if the RSRQ of the downlink carrier is less than the value of the quality limit, it means the reference uplink carrier has a worse quality at this time and the information may not be transmitted to the target base station effectively. The reference uplink carrier is any one of the plurality of uplink carriers.

The target base station can divide cells it covers into several regions, determine the value of the quality limit of the downlink carrier corresponding to each uplink carrier when the terminal device is in different regions and store the value of the quality limit of the downlink carrier corresponding to each uplink carrier according to each region. After the terminal device accesses the target base station, the target base station can obtain the value of the quality limit of the downlink carrier corresponding to each uplink carrier in the region where the terminal device is located, determine the quality threshold according to the value of the quality limit and notifies the terminal device by an RRC message so that the terminal device can determine, in the region, the first target uplink carrier according to the quality threshold and the RSRQ of the current downlink carrier.

With two uplink carriers, i.e., one SUL carrier and one non-SUL, included by the target base station as an example, suppose the terminal device is in a current region, and the value of the quality limit of the downlink carrier corresponding to the SUL carrier is −10 and the value of the quality limit of the downlink carrier corresponding to the non-SUL carrier is −5, then it means when downlink carrier has a worse quality, the SUL carrier can still ensure reliable data transmission and while the RSRQ of the downlink carrier is less than −5, the non-SUL carrier cannot ensure the reliability of uplink data. As a result, the target base station can set the quality threshold of the terminal device in the current region as −5 according to the value of the quality limit of the uplink carrier according to the non-SUL carrier and notify the terminal device by the RRC message. The terminal device stores the quality threshold and when the random access is needed to be initiated, the terminal device first detects the RSRQ of the current downlink carrier, and then determine a value relationship between the RSRQ and the quality threshold. The non-SUL carrier is determined as the first target uplink carrier when the RSRQ is greater than or equal to the quality threshold, which means the RSRQ is greater than or equal to −5; the SUL carrier is determined as the first target uplink carrier when the RSRQ is less than the quality threshold, which means the RSRQ of the downlink carrier is less than −5.

Specifically, a third function field can be added in the RRC message in advance and pre-agreed between two sides: the terminal device and the target base station. After obtaining the quality threshold, the target base station can write the quality threshold into the third function threshold and after receiving the RRC message, the terminal device can obtain the quality threshold by parsing the third function field.

In a practical application, the target base station can add the power threshold and the quality threshold in the RRC message at the same time and transmit the RRC message to the terminal device. After receiving the RRC message, the terminal device stores the power threshold and the quality threshold. When a random access is needed, the terminal device can first detect the RSRP and the RSRQ of the current downlink carrier and then determine the first target uplink carrier among the plurality of uplink carriers corresponding to the target base station according to the RSRP and the power threshold as well as the RSRQ and the quality threshold. For example, the terminal device can determine the value relationship between the RSRP of the downlink carrier and the power threshold and the value relationship between the RSRQ and the quality threshold respectively. The non-SUL carrier is determined as the first target uplink carrier in response to the RSRP being greater than or equal to the power threshold or in response to the RSRQ being greater than or equal to the quality threshold; and the SUL carrier is determined as the first target uplink carrier in response to the RSRP being less than the power threshold and the RSRQ being less than the quality threshold.

With two uplink carriers, i.e., one SUL carrier and one non-SUL, included by the target base station as an example, suppose the terminal device is in the current region, and the power threshold is set by the target base station as 70 dB and quality threshold is set as −5. When the random access is needed, the terminal device can first detect the RSRP and the RSRQ of the downlink carrier. The non-SUL carrier is determined as the first target uplink carrier when the RSRP is greater than or equal to 70 dB or the RSRQ is greater than or equal to −5 and the SUL carrier is determined as the first target uplink carrier when the RSRP is less than 70 dB or the RSRQ is less than −5.

In the technical solutions provided in the embodiments of the disclosure, the terminal device can determine, according to a receiving quality of a reference signal of the downlink carrier and the quality threshold set in advance by the target base station, the first target uplink carrier for transmitting a random access preamble among the plurality of uplink carriers corresponding to the target base station, and transmit the random access preamble to the target base station using the first target uplink carrier to initiate a random access, so that the random access is implemented in cells configured with the SUL carrier, thus the success rate of the random access is increased.

Figure 1I:
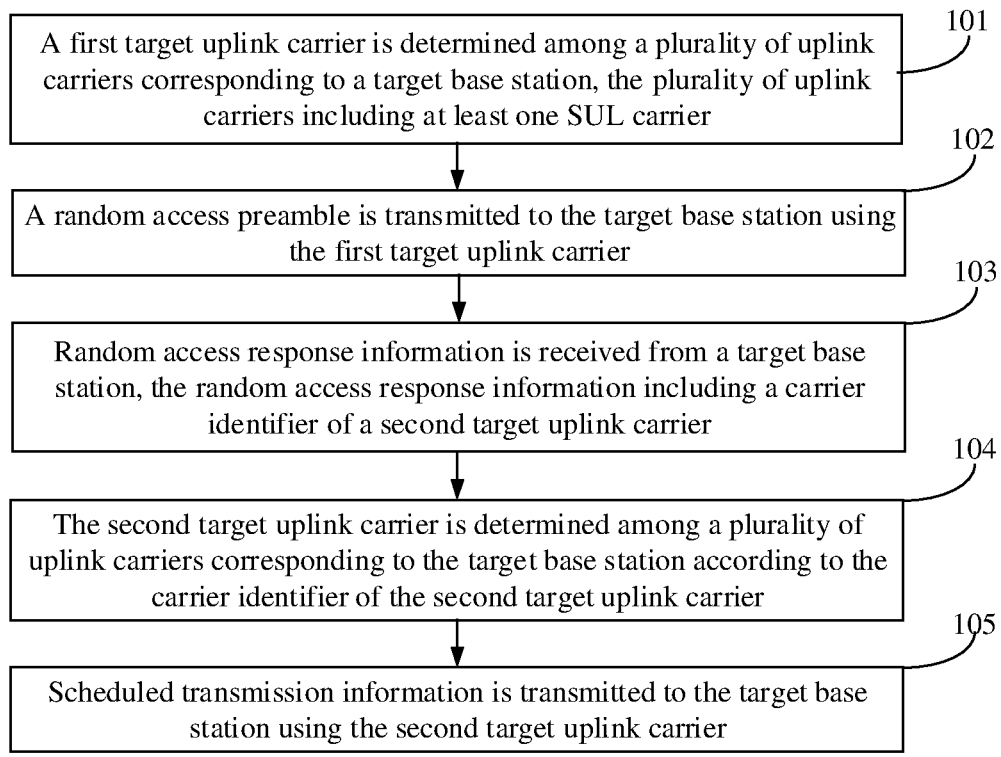
FIG. 1I is a flowchart illustrating a random access method according to an exemplary embodiment.

In an embodiment of the disclosure, as illustrated in FIG. 1I, the method also includes operations 103 to 105.

In operation 103, random access response information is received from a target base station, the random access response information including a carrier identifier of a second target uplink carrier.

In operation 104, the second target uplink carrier is determined among a plurality of uplink carriers corresponding to the target base station according to the carrier identifier of the second target uplink carrier.

In operation 105, scheduling transmission information is transmitted to the target base station using the second target uplink carrier.

Exemplarily, after receiving a random access preamble from the terminal device, the target base station can transmit random access response information to the terminal device.

If a current random access is a non-competitive random access, the terminal device can implement the random access according to the random access response information; if the current random access is a competitive random access, the terminal device needs to transmit the scheduled transmission information to the target base station according to the random access response information and at this time the target base station can also configure, for the terminal device, the second target uplink carrier used for transmitting the scheduled transmission information.

According to an embodiment of the disclosure, during the competitive random access, the target base station receives a random access preamble from the terminal device and can obtain a carrier, where a PDCCH is, from the plurality of uplink carriers corresponding to the target base station and determine the carrier the second target uplink carrier used by the terminal device to transmit the scheduled transmission information and carry the carrier identifier of the second target uplink carrier in the random access response information and transmit the random access response information to the terminal. In the embodiments of the disclosure, the carrier identifier of the second target uplink carrier, which is included in the random access response information, is designated as a fifth carrier identifier for the purpose of differentiation. After obtaining the random access response information, the terminal device obtains, a carrier with a carrier identifier same as the fifth carrier identifier among the plurality of uplink carriers, as a carrier for transmitting the scheduled transmission information, herein the carrier is the second target uplink carrier configured for the terminal device by the target base station. In a practical application, the second target uplink carrier can be same as or different from the first target uplink carrier. There are no limits made in the embodiments of the disclosure.

In the technical solutions provided in the embodiments of the disclosure, the terminal device can determine, according to configuration of the target base station, the second target uplink carrier for transmitting the scheduled transmission information among the plurality of uplink carriers, and transmit the scheduled transmission information to the target base station using the second target uplink carrier, so that the random access based on a competitive mechanism is implemented in cells configured with the SUL carrier, thus the success rate of the random access is increased.

Figure 1J:
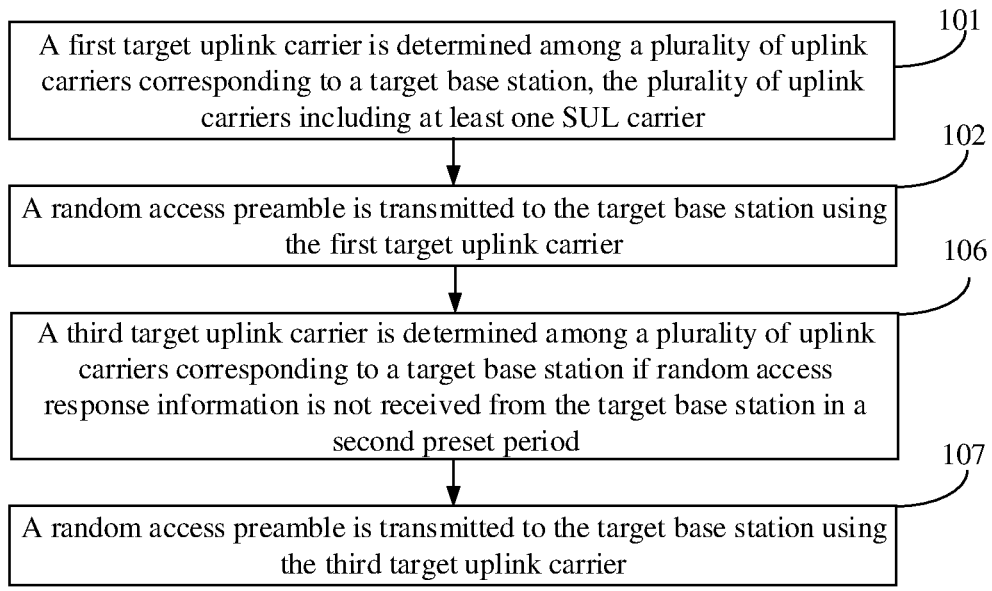
FIG. 1J is a flowchart illustrating a random access method according to an exemplary embodiment.

In an embodiment of the disclosure, as illustrated in the FIG. 1J, the method also includes operations 106 and 107.

In operation 106, a third target uplink carrier is determined among a plurality of uplink carriers corresponding to a target base station if random access response information is not received from the target base station in a second preset period.

In operation 107, a random access preamble is transmitted to the target base station using the third target uplink carrier.

Exemplarily, if the terminal device does not receive the random access response information from the target base station in the second preset period after transmitting a random access preamble to the target base station, it means that the random access is unsuccessful and the terminal device can change the carrier for transmitting random access preamble. With two uplink carriers, i.e., one SUL carrier and one non-SUL, included by the target base station as an example, suppose a first target uplink carrier determined by the terminal device to transmit the random access preamble for the first time is the SUL carrier, if the random access response information is not received from the target base station in the second preset period, then terminal device can re-transmit the random access preamble to the target base station using the non-SUL carrier which is the third target uplink carrier.

According to an embodiment of the disclosure, if the terminal device transmits the random access preamble to the target base station on the first target uplink carrier with a first transmitting power, then the terminal device can continue to transmit the random access preamble to the target base station on the third target uplink carrier with the first transmitting power, which decreases losses of the terminal devices.

In the technical solutions provided in the embodiments of the disclosure, when the initiated random access is not responded, the terminal device can change the third target uplink carrier for transmitting the random access preamble, and re-transmit the random access preamble to the target base station using the third target uplink carrier, so that the success rate of the random access is increased.

Base Station Side

In the embodiments of disclosure, a random access method is provided and used in the base station which can transmit indication information to the terminal device and the indication information is configured to indicate a first target uplink carrier to be determined, by the terminal device for transmitting a random access preamble, among a plurality of uplink carriers corresponding to the base station, and the plurality of uplink carriers include at least one SUL carrier.

Exemplarily, the indication information can be a carrier identifier of a first target uplink carrier configured, by the base station, for the terminal device to transmit a random access preamble, and can also be a power threshold or a quality threshold configured, by the base station, for the terminal device.

With two uplink carriers, i.e., one SUL carrier and one non-SUL, included by the base station as an example, the base station can test a value of an attenuation limit according to the SUL carrier and a value of an attenuation limit according to the non-SUL carrier respectively when a location of the terminal device remains unchanged. With the non-SUL carrier as an example, when a current location of the terminal device remains unchanged, the base station can test a relationship between an attenuation degree of the downlink carrier and an attenuation degree of the non-SUL carrier and determine the value of the attenuation limit of the downlink carrier. If the attenuation of the downlink carrier is greater than the value of the attenuation limit, then the attenuation of the non-SUL carrier is excessively great and information is not able to be transmitted to the base station in an effective way; if the attenuation of the downlink carrier is less than or equal to the value of the attenuation limit, then attenuation of the non-SUL carrier at this time is smaller and reliability of uplink information can be ensured. In the same way, the value of the attenuation limit of the downlink carrier corresponding to the SUL carrier can be determined.

The base station can divide cells it covers into several regions, determine the value of the attenuation limit of the downlink carrier corresponding to the SUL carrier and the value of the attenuation limit of the downlink carrier corresponding to the non-SUL carrier respectively when the terminal device is in different regions and store the value of the attenuation limit of the downlink carrier corresponding to the SUL carrier and the value of the attenuation limit of the downlink carrier corresponding to the non-SUL carrier according to each region. After the terminal device accesses the base station, the base station can obtain, according to the region where the current terminal device is, the value of the attenuation limit of the downlink carrier corresponding to the SUL carrier and the value of the attenuation limit of the downlink carrier corresponding to the non-SUL carrier, determine a power threshold according to the value of the attenuation limit and notifies the terminal device by an RRC message so that the terminal device in the region can determine the first target uplink carrier according to the power threshold and an RSRP of a current downlink carrier.

It is assumed that in a current region where the terminal device is located, the value of the attenuation limit of the downlink carrier corresponding to the non-SUL carrier is 30 dB, and the value of the attenuation limit of the downlink carrier corresponding to the SUL carrier is 50 dB. That is to say, when the attenuation of the downlink carrier is 50 dB, the SUL carrier can still ensure reliable data transmission and when the attenuation of the downlink carrier is greater than 30 dB, the non-SUL carrier cannot ensure reliability of uplink data. As a result, the base station can set, according to the value of the attenuation limit of the downlink carrier corresponding to the non-SUL carrier, the power threshold of the terminal device in the current region to 70 dB, which means that when the RSRP of the received downlink carrier is less than 70 dB, the attenuation of the downlink carrier is greater than 30 dB; when the RSRP of the received downlink carrier is greater than or equal to 70 dB, the attenuation of the downlink carrier is less than or equal to 30 dB. Then the base station can notify the terminal device of the power threshold by the RRC message. The terminal device stores the power threshold, and when the random access is needed to be initiated, the terminal device first detects the RSRP of the current downlink carrier, which shows the attenuation degree of the downlink carrier, and then determines a value relationship between the RSRP and the power threshold. Specifically, the non-SUL carrier is determined as the first target uplink carrier when the RSRP is greater than or equal to the power threshold, i.e., the RSRP is greater than or equal to 70 dB; the SUL carrier is determined as the first target uplink carrier when the RSRP is less than the power threshold, i.e., the RSRP is less than 70 dB.

According to an embodiment of the disclosure, the base station can test a value of quality limit of the downlink carrier corresponding to the SUL carrier and a value of quality limit of the downlink carrier corresponding to the non-SUL carrier respectively when the location of the terminal device remains unchanged. With the non-SUL carrier as an example, the base station can test the relationship between an RSRQ of the downlink carrier and an RSRQ of the non-SUL carrier and determine the value of the quality limit of the downlink carrier when the location of the terminal device remains unchanged. If the RSRQ of the downlink carrier is greater than or equal to the value of the quality limit, it means that the non-SUL carrier has a better quality and the reliability of the uplink information can be ensured; if the RSRQ of the downlink carrier is less than the value of the quality limit, it means that non-SUL carrier has a worse quality and the information may not be able to be transmitted to the base station. In the same way, the value of the quality limit of the downlink carrier according to the SUL carrier can be tested.

The base station can divide cells it covers into several regions, determine the value of the quality limit of the downlink carrier corresponding to the SUL carrier and the value of the quality limit of the downlink carrier corresponding to the non-SUL carrier respectively when the terminal device is in different regions and store the value of the quality limit of the downlink carrier corresponding to the SUL carrier and the value of the quality limit of the downlink carrier corresponding to the non-SUL carrier according to each region. After the terminal device accesses the base station, the base station can obtain, according to the region where the current terminal device is, the value of the quality limit of the downlink carrier corresponding to the SUL carrier and the value of the quality limit of the downlink carrier corresponding to the non-SUL carrier, determine a quality threshold according to the value of the quality limit and notifies the terminal device by the RRC message so that the terminal device in the region can determine the first target uplink carrier according to the quality threshold and an RSRQ of the current downlink carrier.

It is assumed that in the current region where the terminal device is located, the value of the quality limit of the downlink carrier corresponding to the SUL carrier is −10, and the value of the attenuation limit of the downlink carrier corresponding to the non-SUL carrier is −5. That is to say, when the downlink carrier has a worse quality, the SUL carrier can still ensure the reliable data transmission and when RSRQ of the downlink carrier is less than −5, the non-SUL carrier cannot ensure the reliability of uplink data. As a result the base station can set, according to the value of the quality limit corresponding to the non-SUL carrier, the quality threshold of the terminal device in the current region to −5 and notify the terminal device of the quality threshold by the RRC message. The terminal device stores the quality threshold and when the random access is needed to be initiated, the terminal device first detects the RSRQ of the current downlink carrier, and then determine a value relationship between the RSRQ and the quality threshold. The non-SUL carrier is determined as the first target uplink carrier when the RSRQ is greater than or equal to the quality threshold, which means the RSRQ is greater than or equal to −5; the SUL carrier is determined as the first target uplink carrier when the RSRQ is less than the quality threshold, which means the RSRQ of the downlink carrier is less than −5.

Figure 2A:
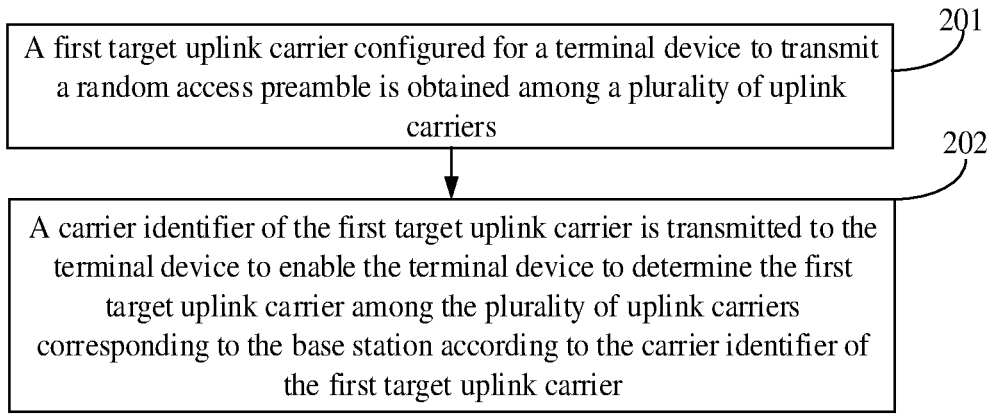
FIG. 2A is a flowchart illustrating a random access method according to an exemplary embodiment.

In an embodiment of the disclosure, as illustrated in FIG. 2A, the random access method includes the operations 201 to 202:

In operation 201, a first target uplink carrier configured for a terminal device to transmit a random access preamble is obtained among a plurality of uplink carriers.

Exemplarily, a base station can determine a carrier, where a PUCCH is, as the first target uplink carrier configured for the terminal device to transmit the random access preamble. If the base station configures the PUCCH on an SUL carrier, the SUL carrier can be configured as the first target uplink carrier, and the terminal device can transmit the random access preamble to the base station using the SUL carrier; if the base station configures the PUCCH on an non-SUL carrier, the non-SUL carrier can be configured as the first target uplink carrier, and the terminal device can transmit the random access preamble to the base station using the non-SUL carrier; if the base station configures that the PUCCH can be regulated dynamically on both the SUL carrier and the non-SUL carrier, then based on a time when a random access is initiated, the base station can determine, as the first target uplink carrier, the SUL carrier or the non-SUL carrier where the PUCCH is on at the time when the random access is initiated.

Alternatively, the base station can obtain a random access resource included by the SUL carrier and a random access resource included by the non-SUL carrier respectively, and determine the first target uplink carrier according to the random access resource included by the SUL carrier and the random access resource included by the non-SUL carrier. For example, according to a time when the random access is initiated, the terminal device can obtain a carrier where an earliest-arriving random access resource is on, and configure the obtained carrier as the first target uplink carrier, herein the earliest-arriving random access resource is a random access resource that arrives at a time closest to the time when the random access is initiated.

Alternatively, the base station can also evaluate a signal quality of the SUL carrier and a signal quality of the non-SUL carrier in advance, select a carrier with a better signal quality and configure the selected carrier as the first target uplink carrier. Specifically, the base station can evaluate the signal quality of the SUL carrier and the signal quality of the non-SUL carrier according to a number of lost packets in a preset reference period. The less the packets are lost, the better the signal quality is.

In operation 202, a carrier identifier of the first target uplink carrier is transmitted to the terminal device to enable the terminal device to determine the first target uplink carrier among the plurality of uplink carriers corresponding to the base station according to the carrier identifier of the first target uplink carrier.

Exemplarily, after determining the first target uplink carrier needed to be configured for the terminal device, the base station can transmit the carrier identifier of the first target uplink carrier to the terminal device so that the terminal device can determine, among the SUL carrier and the non-SUL carrier, the first target uplink carrier configured by the base station and transmit the random access preamble on the first target uplink carrier.

In the technical solutions provided in the embodiments of the disclosure, the base station can configure, among the plurality of uplink carrier, configure the first target uplink carrier for the terminal device to transmit the random access preamble to enable the terminal device to transmit the random access preamble to the base station using the first target uplink carrier to initiate the random access, so that the random access is implemented in cells configured with the SUL carrier, thus the success rate of the random access is increased.

Figure 2B:
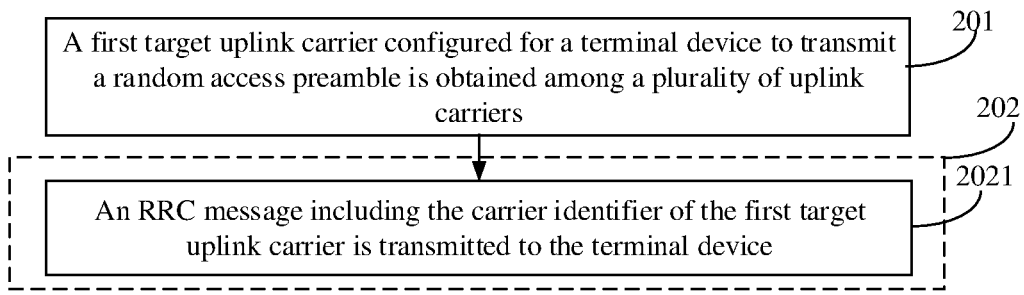
FIG. 2B is a flowchart illustrating a random access method according to an exemplary embodiment.

In an embodiment of the disclosure, as illustrated in the FIG. 2B, the operation 202 of transmitting a carrier identifier of a first target uplink carrier to a terminal device can be implemented by operation 2021.

In operation 2021, an RRC message including the carrier identifier of the first target uplink carrier is transmitted to the terminal device.

Exemplarily, the RRC message is information transmitted by a base station to the terminal device to regulate and control resource configuration. As a result, after the terminal device accesses the base station, the base station can write the carrier identifier of the first target uplink carrier into the RRC message and transmit the RRC message to the terminal device while the base station configures other uplink resource or downlink resource for the terminal device via the RRC message.

Specifically, a first function field can be added in the RRC message in advance and pre-agreed between two sides: the terminal device and the base station. After obtaining the first target uplink carrier, the base station can write the carrier identifier of the first target uplink carrier into the first function field. After receiving the RRC message, the terminal device can obtain a first carrier identifier by parsing the first function field and determine, as the first target uplink carrier, a carrier corresponding to the first carrier identifier in the SUL and non-SUL carrier included by the base station.

In the technical solutions provided in the embodiments of the disclosure, the base station can configure, among a plurality of uplink carriers, the first target uplink carrier for the terminal device to transmit a random access preamble and notify the terminal device via the RRC message to enable the terminal device to transmit the random access preamble to the base station using the first target uplink carrier to initiate a random access, so that the random access is implemented in cells configured with the SUL carrier, thus the success rate of the random access is increased.

Figure 2C:
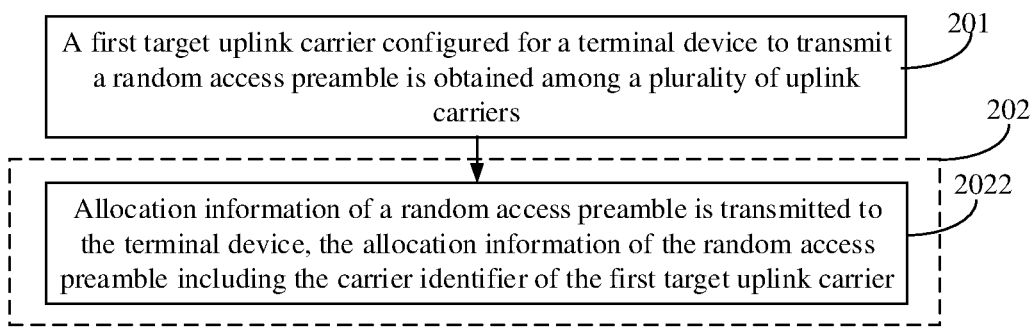
FIG. 2C is a flowchart illustrating a random access method according to an exemplary embodiment.

In an embodiment of the disclosure, as illustrated in the FIG. 2C, the operation 202 of transmitting a carrier identifier of a first target uplink carrier to a terminal device can be implemented by operation 2022.

In operation 2022, allocation information of a random access preamble is transmitted to the terminal device, the allocation information of the random access preamble including the carrier identifier of the first target uplink carrier.

Exemplarily, when triggering an non-competitive random access using a PDCCH command, the base station can allocate a random access preamble to the terminal device according to a preset rule and concurrently obtain, among a plurality of uplink carriers, a carrier where the PDCCH is on, as the first target uplink carrier configured for the terminal device to transmit the random access preamble; the base station can then generate the allocation information of the random access preamble according to the random access preamble and the carrier identifier of the first target uplink carrier, and transmit the allocation information of the random access preamble to the terminal device.

In the technical solutions provided in the embodiments of the disclosure, in the non-competitive random access, the base station can configure, among the plurality of uplink carriers, the first target uplink carrier for the terminal device to transmit the random access preamble and notify the terminal device via the allocation information of the random access preamble to enable to terminal device to transmit the random access preamble to the base station using the first target uplink carrier to initiate the random access, so that the random access is implemented in cells configured with the SUL carrier, thus the success rate of the random access is increased.

Figure 2D:
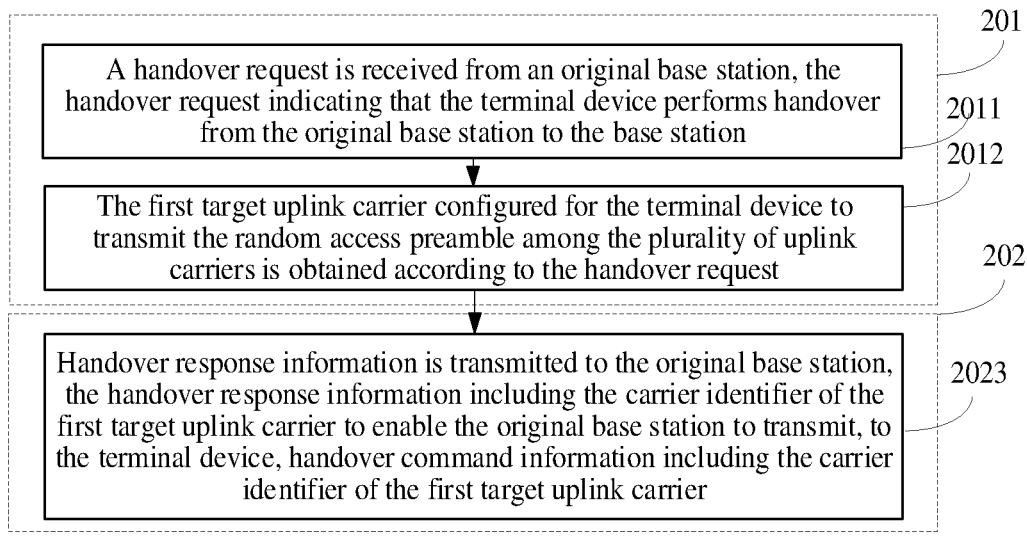
FIG. 2D is a flowchart illustrating a random access method according to an exemplary embodiment.

In an embodiment of the disclosure, as illustrated in the FIG. 2D, the operation 201 of obtaining, among a plurality of uplink carriers, a first target uplink carrier configured for a terminal device to transmit a random access preamble can be implemented by operations 2011 and 2012; the operation 202 of transmitting a carrier identifier of the first target uplink carrier to the terminal device can be implemented by operation 2023.

In operation 2011, a handover request is received from an original base station, the handover request indicating that the terminal device performs handover from the original base station to the base station.

In operation 2012, the first target uplink carrier configured for the terminal device to transmit the random access preamble among the plurality of uplink carriers is obtained according to the handover request.

In operation 2023, handover response information is transmitted to the original base station, the handover response information including the carrier identifier of the first target uplink carrier to enable the original base station to transmit, to the terminal device, handover command information including the carrier identifier of the first target uplink carrier.

Exemplarily, during usage, the terminal device may perform handover between the base stations. When detecting that the terminal devices needs to perform the handover between the base stations, an original base station accessed currently by the terminal device can transmit a handover request to a base station that the terminal device is about to access. After receiving the handover, the base station can obtain, among an SUL carrier and a non-carrier carrier, a carrier where a PDCCH is on, as the first target uplink carrier configured for the terminal device to transmit a random access preamble; and then generate handover request response information according to a carrier identifier of the first target uplink carrier, and transmit the handover request response information to the original base station. In a practical application, the handover request response information also includes the carrier identifier of the SUL carrier and the carrier identifier of the non-SUL carrier. The original base station can generate handover command information according to the handover request response information and the handover command information includes the carrier identifier of the SUL carrier, the carrier identifier of the non-SUL carrier and the carrier identifier of the first target uplink carrier and transmit the handover command information to the terminal device.

In a practical application, a function field can be added in the handover request response information and the handover command information. Then the function field can be configured to carry the carrier identifier of the first target uplink carrier.

In the technical solutions provided in the embodiments of the disclosure, when the terminal device performs the handover between the base stations, the base station can configure, among the plurality of uplink carriers, the first target uplink carrier for the terminal device to transmit the random access preamble and notify the original base station via the handover response information, so that the original base station can notify the terminal device and the random access is implemented in cells configured with the SUL carrier, thus the success rate of the random access is increased.

Figure 2E:
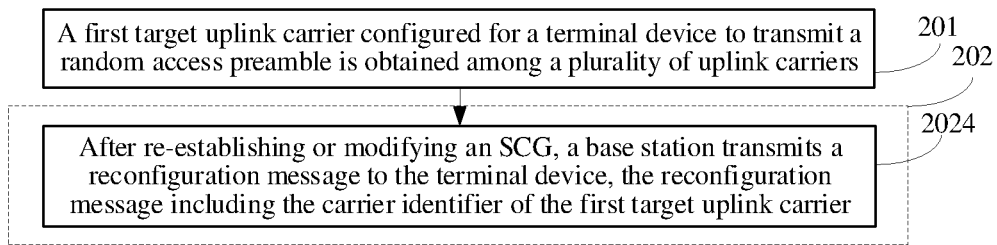
FIG. 2E is a flowchart illustrating a random access method according to an exemplary embodiment.

In an embodiment of the disclosure, as illustrated in the FIG. 2E, the operation 202 of transmitting a carrier identifier of a first target uplink carrier to a terminal device can be implemented by operation 2024.

In operation 2024, after re-establishing or modifying an SCG, a base station transmits a reconfiguration message to the terminal device and the reconfiguration message including the carrier identifier of the first target uplink carrier.

Exemplarily, the base station may re-establish or modify the SCG in the cells and may reconfigure a carrier used for transmitting a random access preamble for a terminal device after re-establishing or modifying the SCG because different SCGs maintain different resources. According to an embodiment of the disclosure, after re-establishing or modifying the SCG, the base station obtains, among the SUL carrier and non-SUL carrier, a carrier where a current PDCCH is on and configures the obtained carrier as the first target uplink carrier for the terminal device to transmit a random access preamble. Because after re-establishing or modifying the SCG, the base station needs to transmit the reconfiguration message to the terminal device to notify the terminal device of a latest resource configuration situation. As a result, the base station can carry the carrier identifier of the first target uplink carrier in the reconfiguration message and transmit the reconfiguration message to the terminal device.

In the technical solutions provided in the embodiments of the disclosure, when re-establishing or modifying the SCG, the base station notifies the terminal device, via the reconfiguration message, of the first target uplink carrier configured for the terminal device to transmit the random access preamble, so that the random access is implemented in cells configured with the SUL carrier, thus the success rate of the random access is increased.

Figure 2F:
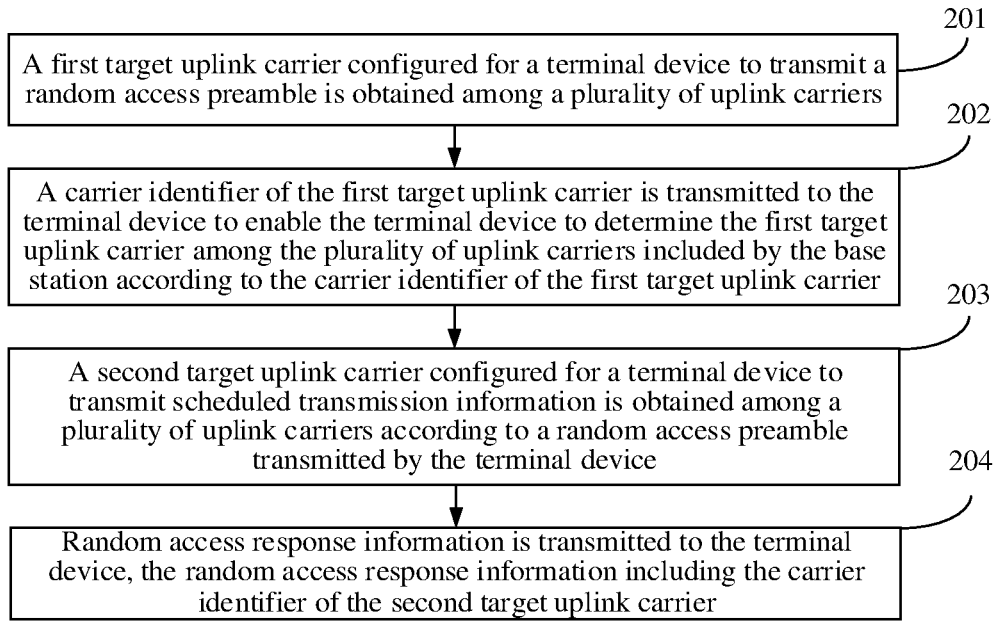
FIG. 2F is a flowchart illustrating a random access method according to an exemplary embodiment.

In an embodiment of the disclosure, as illustrated in the FIG. 2F, the method further includes operations 203 and 204.

In operation 203, a second target uplink carrier configured for a terminal device to transmit scheduled transmission information is obtained among a plurality of uplink carriers according to a random access preamble transmitted by the terminal device.

In operation 204, random access response information is transmitted to the terminal device, the random access response information including the carrier identifier of the second target uplink carrier.

Exemplarily, during a competitive random access, the base station receives the random access preamble from the terminal from the terminal device and can obtain, among an SUL carrier and a non-SUL carrier, a carrier where a PDCCH is on, as the second target uplink carrier used by the terminal device to transmit scheduled transmission information, and then carry the carrier identifier of the second target uplink carrier in the random access response information, and notify the terminal device of the random access response information. After obtaining the random access response information, the terminal device obtains, among the SUL carrier and the non-SUL carrier, a carrier with a carrier identifier same as the carrier identifier included by the random access response information, as a carrier for transmitting the scheduled transmission information, herein the carrier is the second target uplink carrier configured for the terminal device by the base station. In a practical application, the second target uplink carrier can be same as or different from the first target uplink carrier. There are no limits made in the embodiments of the disclosure.

In the technical solutions provided in the embodiments of the disclosure, the base station can also configure the second target uplink carrier for the terminal device to transmit the scheduled transmission message and notify the terminal device via the random access response information, so that the random access is implemented in cells configured with the SUL carrier, thus the success rate of the random access is increased.

The technical solutions in the embodiments of the disclosure will be described below by means of a specific embodiment of the disclosure.

First Embodiment

Figure 3:
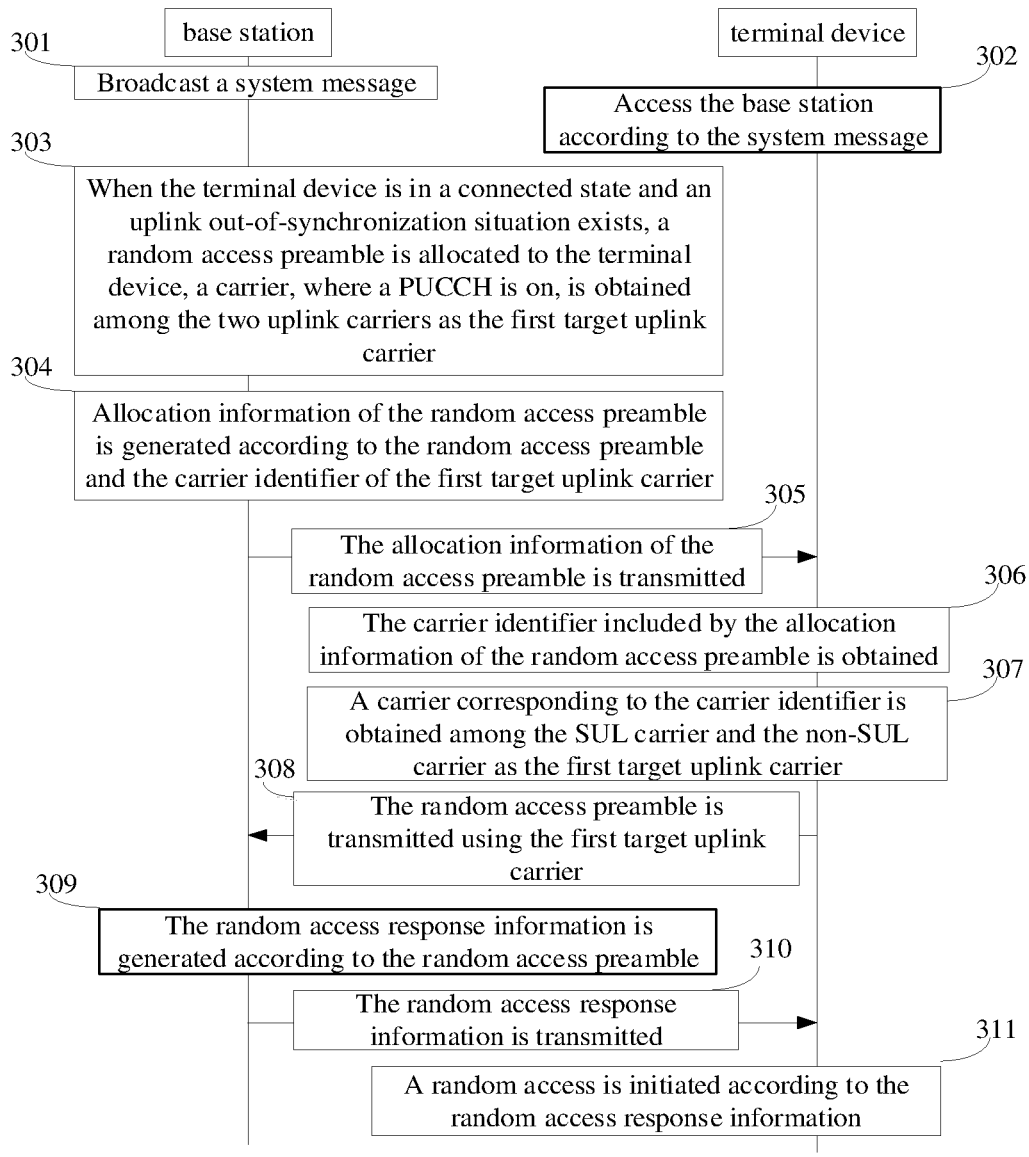
FIG. 3 is an interaction diagram illustrating a random access method according to an exemplary embodiment.

FIG. 3 is an interaction diagram illustrating a random access method according to an exemplary embodiment. The random access method is applied to a terminal device and a base station, herein the base station includes: two uplink carriers including one SUL carrier and one non-SUL carrier, and one downlink carrier. As illustrated in FIG. 3, the method includes the following operations 301 to 311.

In operation 301, the base station broadcasts a system message.

The system information includes a carrier identifier of the SUL carrier, a carrier identifier of the non-SUL carrier and a carrier identifier of the downlink carrier. Usually, the carrier identifier of the SUL carrier can be a frequency of the SUL carrier and the carrier identifier of the non-SUL carrier can be a frequency of the non-SUL carrier and the carrier identifier of the downlink carrier can be a frequency of the downlink carrier.

In operation 302, the terminal device accesses the base station according to the system message.

In operation 303, when the terminal device is in a connected state and an uplink out-of-synchronization situation exists, the base station allocate a random access preamble to the terminal device, obtain, among the two uplink carriers, a carrier where a PUCCH is on, as the first target uplink carrier.

In operation 304, the base station generates allocation information of the random access preamble according to the random access preamble and the carrier identifier of the first target uplink carrier.

In operation 305, the base station transmits the allocation information of the random access preamble to the terminal device.

In operation 306, the terminal device obtains the carrier identifier included by the allocation information of the random access preamble.

Exemplarily, the carrier identifier can be a carrier frequency.

In operation 307, the terminal device obtains, as the first target uplink carrier, a carrier corresponding to the carrier identifier among the SUL carrier and the non-SUL carrier.

In operation 308, the terminal device transmits the random access preamble to the base station using the first target uplink carrier.

If the random access response information is not received from the base station in a second preset period, the terminal device transmits the random access preamble using another uplink carrier other than the first target uplink carrier. Exemplarily, a transmitting power with which the terminal transmits the random access preamble for the second time can be same as the transmitting power with which the terminal transmits the random access preamble for the first time.

In operation 309, the base station generates the random access response information according to the random access preamble.

In operation 310, the base station transmits the random access response information to the terminal device.

In operation 311, the terminal device initiates a random access according to the random access response information.

In a random access method provided in the embodiments of the disclosure, the base station can configure the first target uplink carrier for the terminal device to transmit the random access preamble and notify the terminal device via the allocation information of the random access preamble when the base station is in the uplink out-of-synchronization situation. The terminal device can transmit, on the first target uplink carrier, the random access preamble to a target base station according to configuration of the base station, so that the random access is implemented in cells configured with the SUL carrier, thus the success rate of the random access is increased.

Second Embodiment

Figure 4:
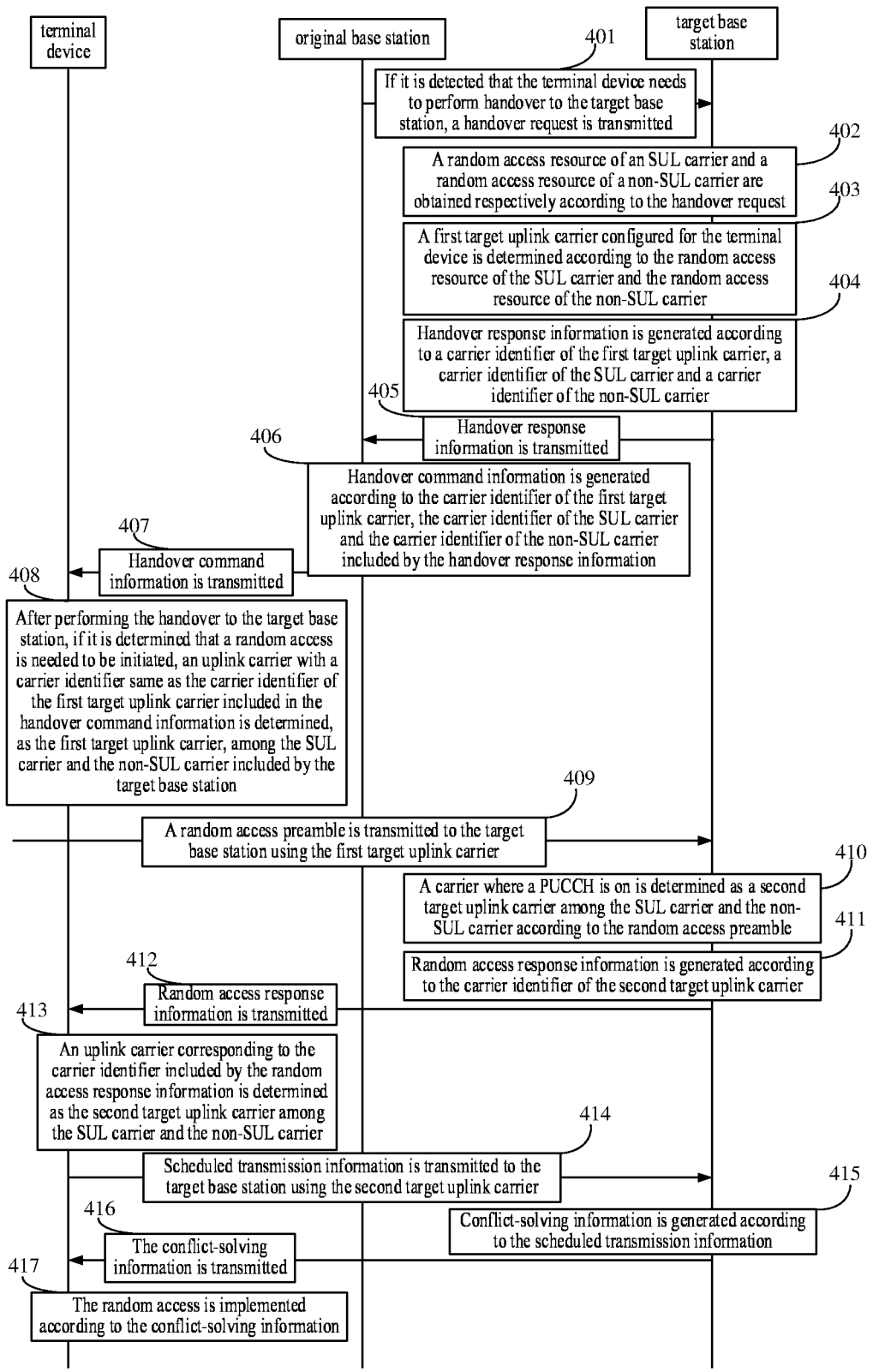
FIG. 4 is an interaction diagram illustrating a random access method according to an exemplary embodiment.

FIG. 4 is an interaction diagram illustrating a random access method according to an exemplary embodiment. The random access method is applied to a terminal device, an original base station and a target base station, herein the target base station includes: two uplink carriers including one SUL carrier and one non-SUL carrier, and one downlink carrier. As illustrated in FIG. 4, the method includes the following operations 401 to 417.

In operation 401, if it is detected that the terminal device needs to perform handover to the target base station, the original base station transmits a handover request to the target base station.

In operation 402, the target base station obtains a random access resource of an SUL carrier and a random access resource of a non-SUL carrier respectively according to the handover request.

In operation 403, the target base station determines a first target uplink carrier configured for the terminal device according to the random access resource of the SUL carrier and the random access resource of the non-SUL carrier.

In operation 404, the target base station generates handover response information according to a carrier identifier of the first target uplink carrier and a carrier identifier of the SUL carrier and a carrier identifier of the non-SUL carrier.

In operation 405, the target base station transmits the handover response information to the original base station.

In operation 406, the original base station generates handover command information according to the carrier identifier of the first target uplink carrier and the carrier identifier of the SUL carrier and the carrier identifier of the non-SUL carrier included by the handover response information.

In operation 407, the original base station transmits the handover command information to the terminal.

In operation 408, after performing the handover to the target base station, if the terminal device determines to initiate a random access, the terminal device determines, among the SUL carrier and the non-SUL carrier included by the target base station, an uplink carrier with the carrier identifier same as the carrier identifier of the first target uplink carrier included in the handover command information as the first target uplink carrier.

In operation 409, the terminal device transmits a random access preamble to the target base station using the first target uplink carrier.

If random access response information is not received from the base station in a second preset period, the terminal device transmits the random access preamble using another uplink carrier other than the first target uplink carrier.

In operation 410, according to the random access preamble, the target base station determines, among the SUL carrier and the non-SUL carrier, a carrier where a PUCCH is as a second target uplink carrier.

In operation 411, the target base station generates random access response information according to the carrier identifier of the second target uplink carrier.

In operation 412, the target base station transmits the random access response information to the terminal device.

In operation 413, the terminal device determines, among the SUL carrier and the non-SUL carrier, an uplink carrier corresponding to the carrier identifier included by the random access response information as the second target uplink carrier.

In operation 414, the terminal device transmits scheduled transmission information to the target base station using the second target uplink carrier.

In operation 415, the target base station generates conflict-solving information according to the scheduled transmission information.

In operation 416, the target base station transmits the conflict-solving information to the terminal device.

In operation 417, the terminal device implements the random access according to the conflict-solving information.

In a random access method provided in the embodiments of the disclosure, the target base station can configure the first target uplink carrier for the terminal device to transmit the random access preamble and notifies the terminal device via allocation information of the random access preamble when the terminal device performs the handover between the base stations. The terminal device can transmit, on the first target uplink carrier, the random access preamble to the target base station according to configuration of the base station, so that the random access is implemented in cells configured with the SUL carrier, thus the success rate of the random access is increased.

Third Embodiment

Figure 5:
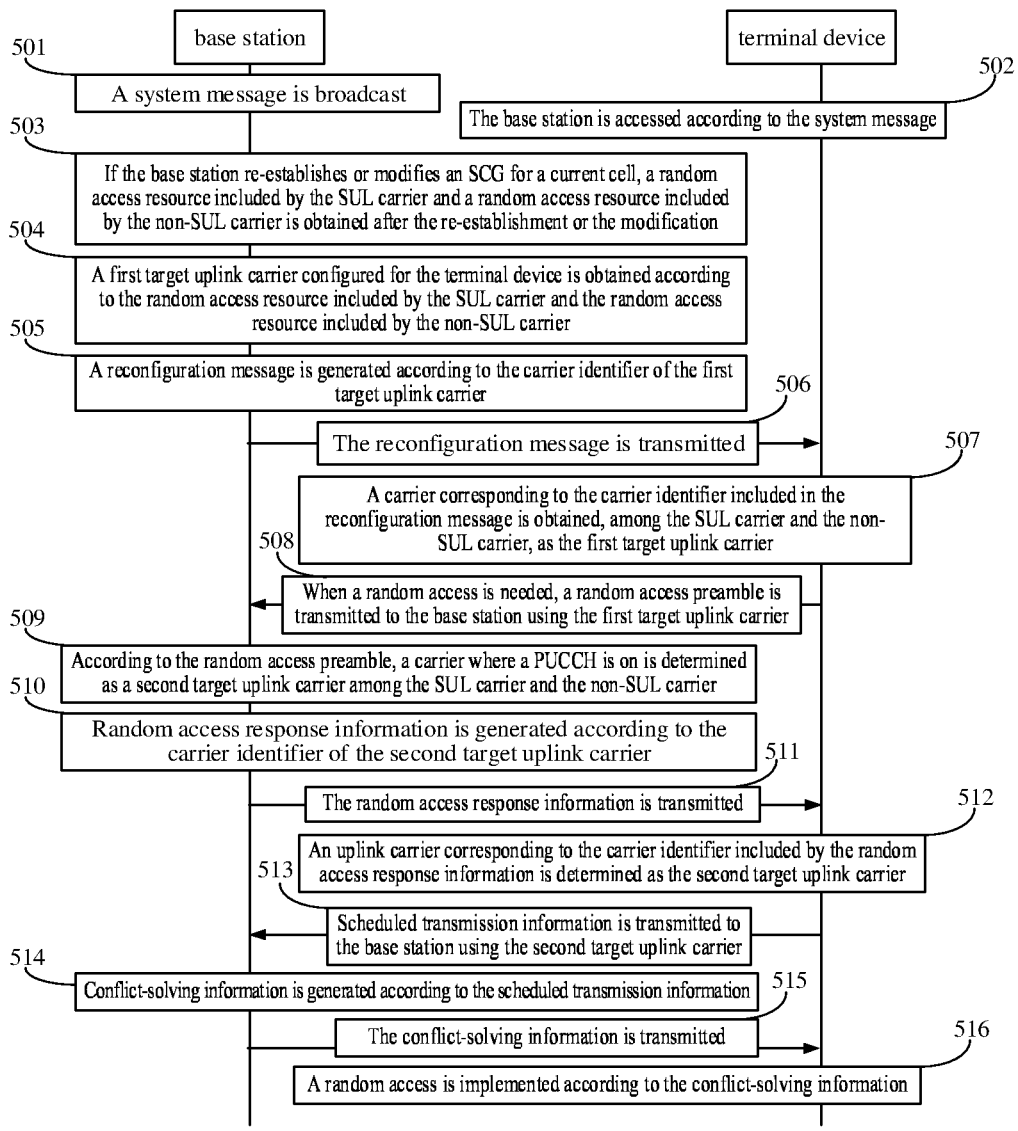
FIG. 5 is an interaction diagram illustrating a random access method according to an exemplary embodiment.

FIG. 5 is an interaction diagram illustrating a random access method according to an exemplary embodiment. The random access method is applied to a terminal device and a base station, herein the base station includes: two uplink carriers including one SUL carrier and one non-SUL carrier, and one downlink carrier. As illustrated in FIG. 5, the method includes the following operations 501 to 516.

In operation 501, the base station broadcasts a system message.

The system information includes a carrier identifier of the SUL carrier, a carrier identifier of the non-SUL carrier and a carrier identifier of the downlink carrier. Usually, the carrier identifier of the SUL carrier can be a frequency of the SUL carrier and the carrier identifier of the non-SUL carrier can be a frequency of the non-SUL carrier and the carrier identifier of the downlink carrier can be a frequency of the downlink carrier.

In operation 502, the terminal device accesses the base station according to the system message.

In operation 503, if the base station re-establishes or modifies an SCG for a current cell, the base station obtain a random access resource included by the SUL carrier and a random access resource included by the non-SUL carrier after the re-establishment or the modification.

In operation 504, the base station obtains a first target uplink carrier configured for the terminal device according to the random access resource included by the SUL carrier and the random access resource included by the non-SUL carrier.

In operation 505, the base station generates a reconfiguration message according to the carrier identifier of the first target uplink carrier.

In operation 506, the base station transmits the reconfiguration message to the terminal device.

In operation 507, the terminal device obtains, among the SUL carrier and the non-SUL carrier, a carrier corresponding to the carrier identifier included in the reconfiguration message, as the first target uplink carrier.

In operation 508, when a random access is needed, the terminal device transmit a random access preamble to the base station using the first target uplink carrier.

If random access response information is not received from the base station in a second preset period, the terminal device transmits the random access preamble using another uplink carrier other than the first target uplink carrier.

In operation 509, according to the random access preamble, the base station determines, among the SUL carrier and the non-SUL carrier, a carrier where a PUCCH is as a second target uplink carrier.

In operation 510, the base station generates random access response information according to the carrier identifier of the second target uplink carrier.

In operation 511, the base station transmits the random access response information to the terminal device.

In operation 512, the terminal device determines, as the second target uplink carrier, an uplink carrier corresponding to the carrier identifier included by the random access response information.

In operation 513, the terminal device transmits scheduled transmission information to the base station using the second target uplink carrier.

In operation 514, the base station generates conflict-solving information according to the scheduled transmission information.

In operation 515, the base station transmits the conflict-solving information to the terminal device.

In operation 516, the terminal device implements a random access according to the conflict-solving information.

In a random access method provided in the embodiments of the disclosure, a target base station can configure the first target uplink carrier for the terminal device to transmit the random access preamble and notify the terminal device via allocation information of the random access preamble when the terminal device performs handover between the base stations. The terminal device can transmit, on the first target uplink carrier, the random access preamble to the target base station according to configuration of the base station, so that the random access is implemented in cells configured with the SUL carrier, thus the success rate of the random access is increased.

The device embodiments of the disclosure below can be used to implement the method embodiments of the disclosure.

Figure 6A:
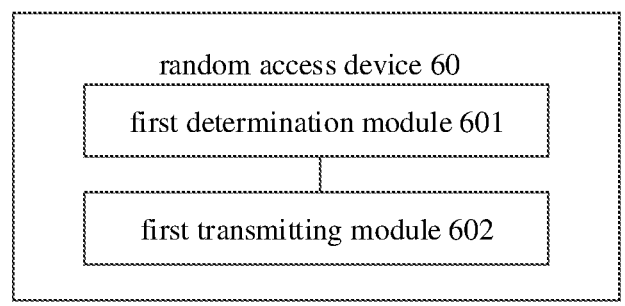
FIG. 6A is a structural schematic diagram illustrating a random access device according to an exemplary embodiment.

FIG. 6A is a block diagram illustrating a random access device 60 according to an exemplary embodiment and the device 60 can be implemented and become a part or all of an electrical device via software, hardware or a combination of the software and the hardware. As illustrated in FIG. 6A, the random access device 60 includes a first determination module 601 and a first transmitting module 602.

The first determination module 601 is configured to determine a first target uplink carrier among a plurality of uplink carriers corresponding to a target base station, the plurality of uplink carriers including at least one SUL carrier.

The first transmitting module 602 is configured to transmit a random access preamble to the target base station using the first target uplink carrier.

Figure 6B:
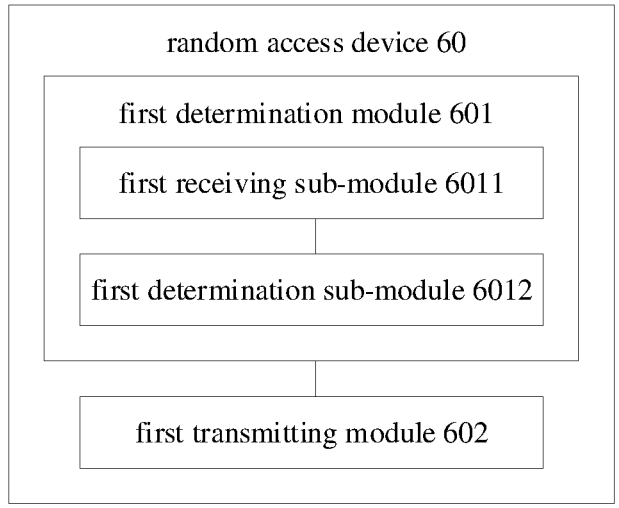
FIG. 6B is a structural schematic diagram illustrating a random access device according to an exemplary embodiment.

In an embodiment of the disclosure, as illustrated in FIG. 6B, the first determination module 601 includes a first receiving sub-module 6011 and a first determination sub-module 6012.

The first receiving sub-module 6011 is configured to receive a carrier identifier of the first target uplink carrier from a base station.

The first determination sub-module 6012 is configured to determine the first target uplink carrier among the plurality of uplink carriers corresponding to the target base station according to the carrier identifier of the first target uplink carrier.

Figure 6C:
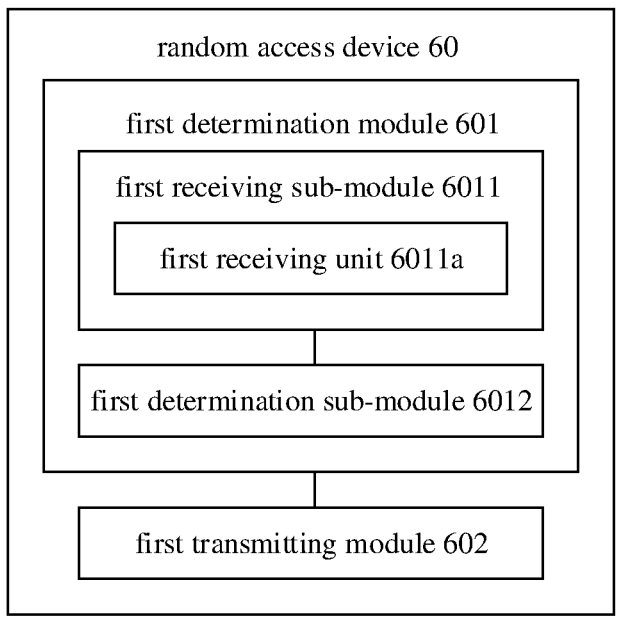
FIG. 6C is a structural schematic diagram illustrating a random access device according to an exemplary embodiment.

In an embodiment of the disclosure, as illustrated in FIG. 6C, the first receiving sub-module 6011 includes a first receiving unit 6011a. The first receiving unit 6011a is configured to receive an RRC message from the target base station, the RRC message including the carrier identifier of the first target uplink carrier.

Figure 6D:
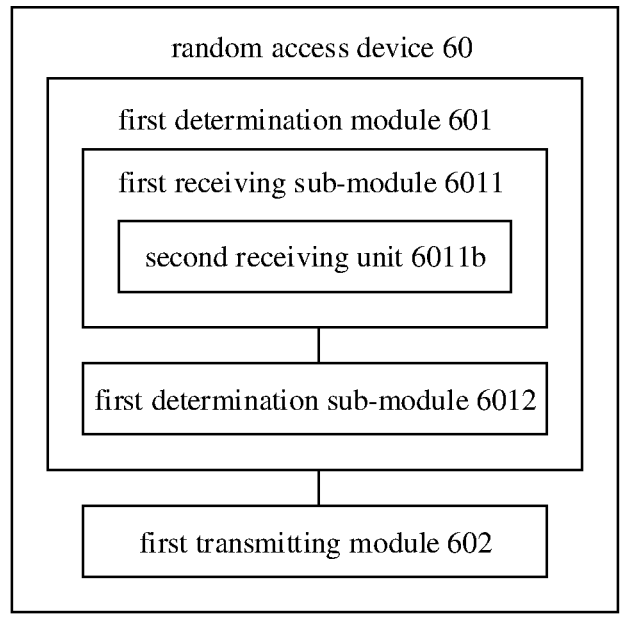
FIG. 6D is a structural schematic diagram illustrating a random access device according to an exemplary embodiment.

In an embodiment of the disclosure, as illustrated in FIG. 6D, the first receiving sub-module 6011 includes a second receiving unit 6011b. The second receiving unit 6011b is configured to receive allocation information of the random access preamble from the target base station, the random access preamble including the carrier identifier of the first target uplink carrier.

Figure 6E:
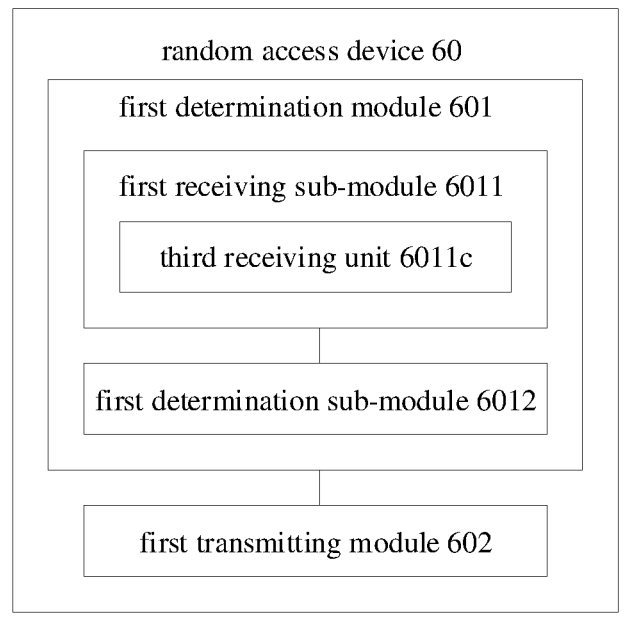
FIG. 6E is a structural schematic diagram illustrating a random access device according to an exemplary embodiment.

In an embodiment of the disclosure, as illustrated in FIG. 6E, the first receiving sub-module 6011 includes a third receiving unit 6011c. The third receiving unit 6011c is configured to receive handover command information from an original base station when the terminal device performs handover between the original base station and the target base station, the handover command information including the carrier identifier of the first target uplink carrier.

Figure 6F:
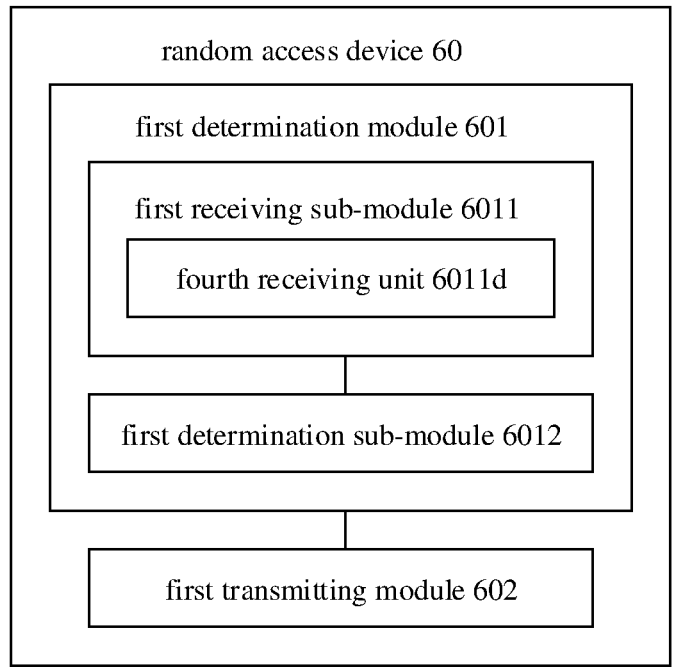
FIG. 6F is a structural schematic diagram illustrating a random access device according to an exemplary embodiment.

In an embodiment of the disclosure, as illustrated in FIG. 6F, the first receiving sub-module 6011 includes a fourth receiving unit 6011d. The fourth receiving unit 6011d is configured to receive a reconfiguration message from the target base station after the target base station re-establishes an SCG or modifies the SCG, the reconfiguration message including the carrier identifier of the first target uplink carrier.

Figure 6G:
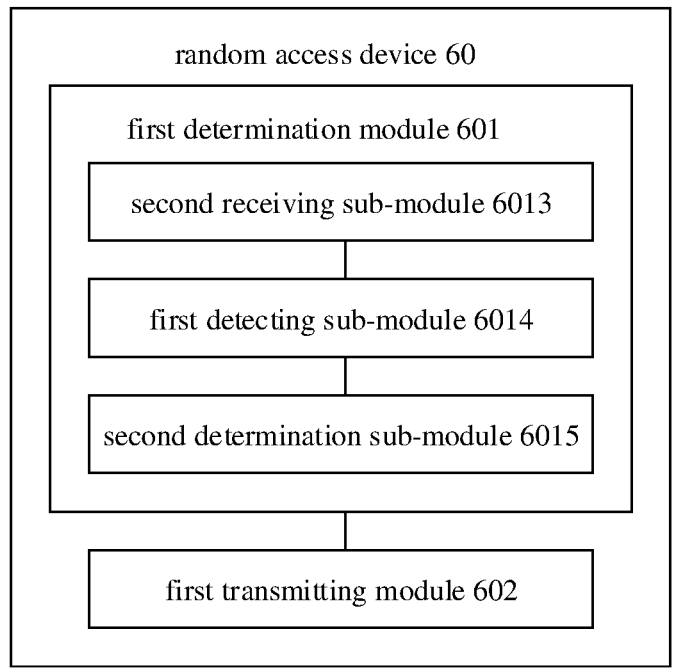
FIG. 6G is a structural schematic diagram illustrating a random access device according to an exemplary embodiment.

In an embodiment of the disclosure, as illustrated in FIG. 6G, the first determination module 601 includes a second receiving sub-module 6013, a first detection sub-module 6014 and a second determination sub-module 6015.

The second receiving sub-module 6013 is configured to receive an RRC message including a power threshold from the target base station.

The first detection sub-module 6014 is configured to detect an RSRP of a current downlink carrier.

The second determination sub-module 6015 is configured to determine the first target uplink carrier among the plurality of uplink carriers corresponding to the target base station, according to the RSRP and the power threshold.

Figure 6H:
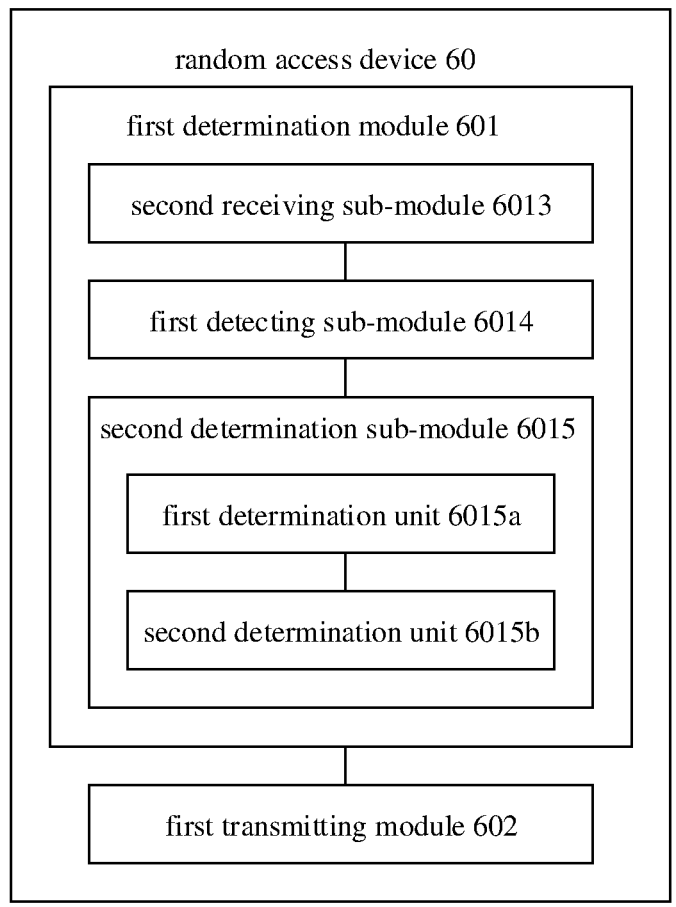
FIG. 6H is a structural schematic diagram illustrating a random access device according to an exemplary embodiment.

In an embodiment of the disclosure, as illustrated in FIG. 6H, the plurality of uplink carriers includes one SUL carrier and one non-SUL carrier; the second determination sub-module 6015 includes a first determination unit 6015a and a second determination unit 6015b.

The first determination unit 6015a is configured to determine the non-SUL carrier as the first target uplink carrier in response to the RSRP being greater than or equal to the power threshold.

The second determination unit 6015b is configured to determine the SUL carrier as the first target uplink carrier in response to the RSRP being less than the power threshold.

Figure 6I:
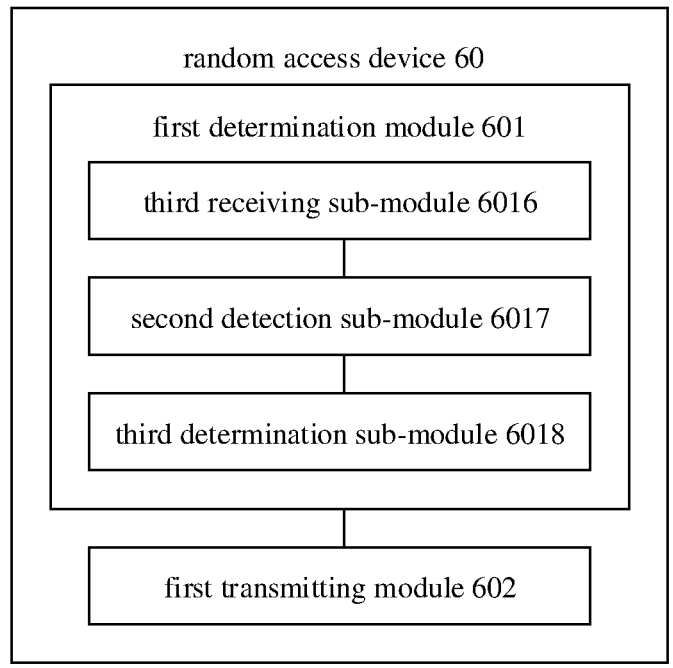
FIG. 6I is a structural schematic diagram illustrating a random access device according to an exemplary embodiment.

In an embodiment of the disclosure, as illustrated in FIG. 6I, the first determination module 601 includes a third receiving sub-module 6016, a second detection sub-module 6017 and a third determination sub-module 6018.

The third receiving sub-module 6016 is configured to receive an RRC message including a quality threshold from the target base station.

The second detection sub-module 6017 is configured to detect an RSRQ of the current downlink carrier.

The third determination sub-module 6018 is configured to determine the first target uplink carrier among the plurality of uplink carriers corresponding to the target base station according to the RSRQ and the quality threshold.

Figure 6J:
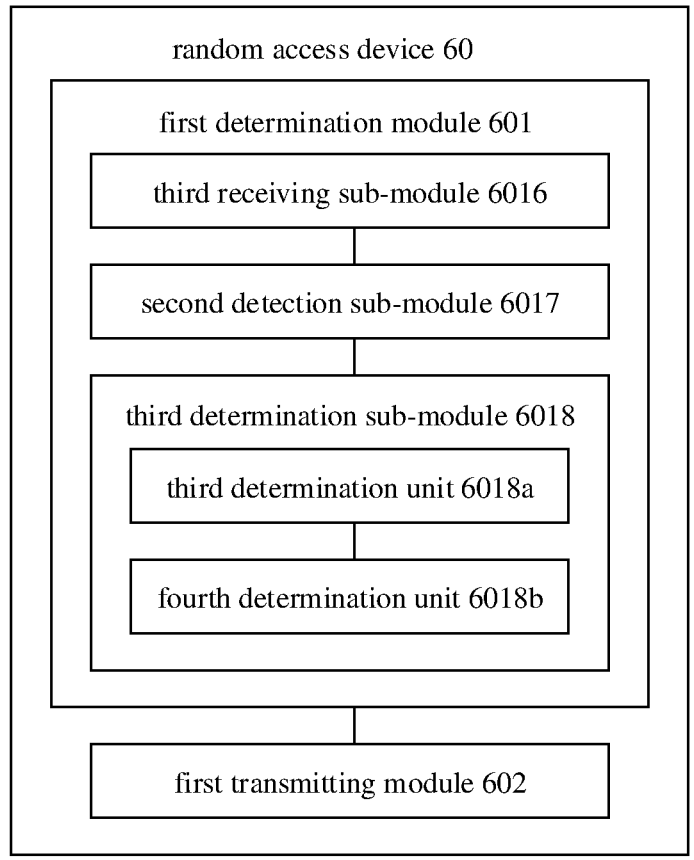
FIG. 6J is a structural schematic diagram illustrating a random access device according to an exemplary embodiment.

In an embodiment of the disclosure, as illustrated in FIG. 6J, the plurality of uplink carriers includes on SUL carrier and one non-SUL carrier; the third determination sub-module 6018 includes a third determination unit 6018a and a fourth determination unit 6018b.

The third determination unit 6018a is configured to determine the non-SUL carrier as the first target uplink carrier in response to the RSRQ being greater than or equal to the quality threshold.

The fourth determination unit 6018b is configured to determine the SUL carrier as the first target uplink carrier in response to the RSRQ being less than the quality threshold.

Figure 6K:
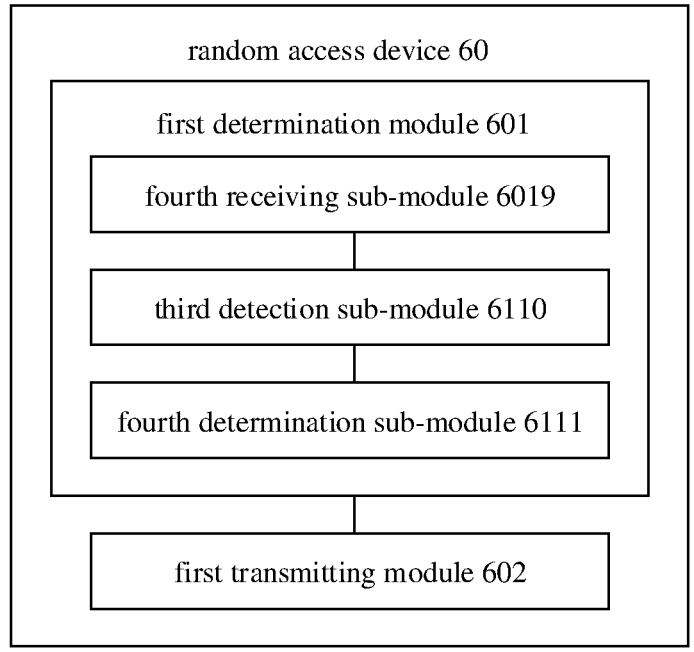
FIG. 6K is a structural schematic diagram illustrating a random access device according to an exemplary embodiment.

In an embodiment of the disclosure, as illustrated in FIG. 6K, the first determination module 601 includes a fourth receiving sub-module 6019, a third detection sub-module 6110 and a fourth determination sub-module 6011.

The fourth receiving sub-module 6019 is configured to receive, from the target base station, an RRC message including a power threshold and a quality threshold.

The third detection sub-module 6110 is configured to detect the RSRP and the RSRQ of the current downlink carrier.

The fourth determination sub-module 6011 is configured to determine the first target uplink carrier among the plurality of uplink carriers corresponding to the target base station according to the RSRP and the power threshold as well as the RSRQ and the quality threshold.

Figure 6L:
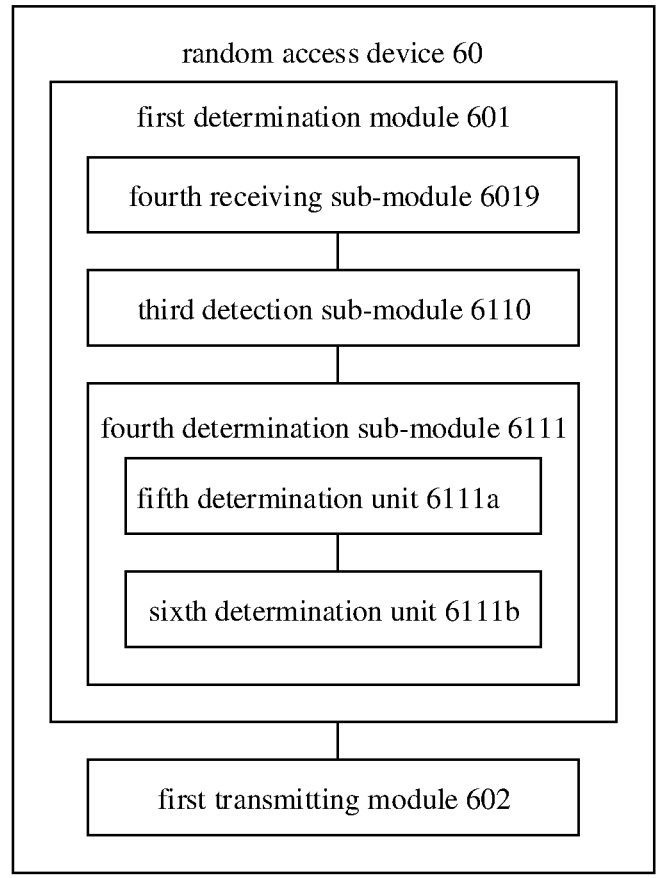
FIG. 6L is a structural schematic diagram illustrating a random access device according to an exemplary embodiment.

In an embodiment of the disclosure, the plurality of uplink carriers includes one SUL and one non-SUL. As illustrated in FIG. 6L, the fourth determination sub-module 6111 includes a fifth determination unit 6111a and a sixth determination unit 6111b.

The fifth determination unit 6111a is configured to determine the non-SUL carrier as the first target uplink carrier when the RSRP is greater than or equal to the power threshold, or the RSRQ is greater than or equal to the quality threshold.

The sixth determination unit 6111b is configured to determine the SUL carrier as the first target uplink carrier in response to the RSRP being less than the power threshold and the RSRQ being less than the quality threshold.

Figure 6M:
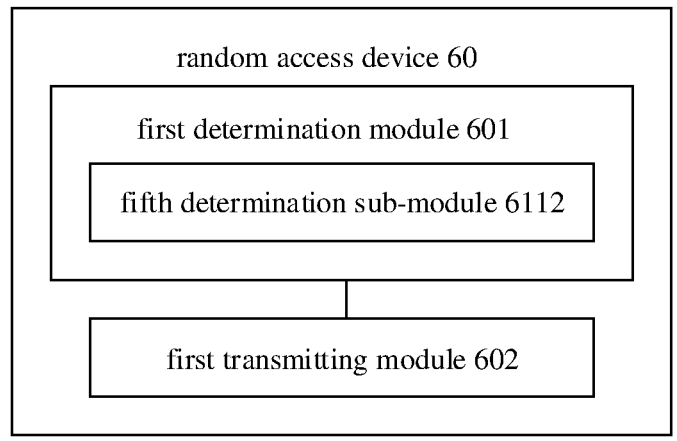
FIG. 6M is a structural schematic diagram illustrating a random access device according to an exemplary embodiment.

In an embodiment of the disclosure, as illustrated in FIG. 6M, the first determination module 601 includes a fifth determination sub-module 6112 configured to determine, as the first target uplink carrier, a carrier configured with a PUCCH among the plurality of uplink carriers.

Figure 6N:
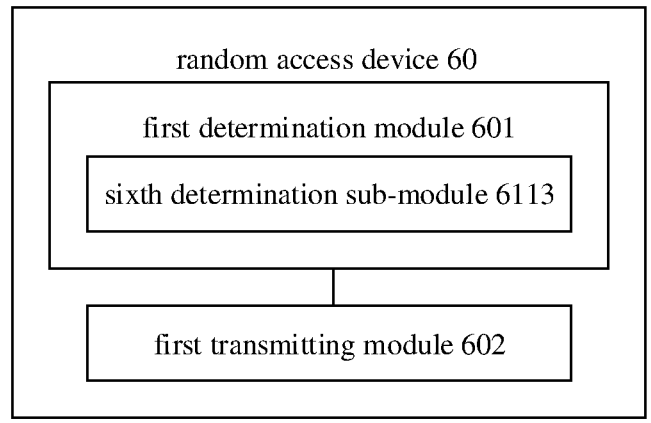
FIG. 6N is a structural schematic diagram illustrating a random access device according to an exemplary embodiment.

In an embodiment of the disclosure, as illustrated in FIG. 6N, the first determination module 601 includes a sixth determination sub-module 6113. The sixth determination sub-module 6113 is configured to determine the first target uplink carrier according to a random access resource included by each of the plurality of uplink carriers.

Figure 6O:
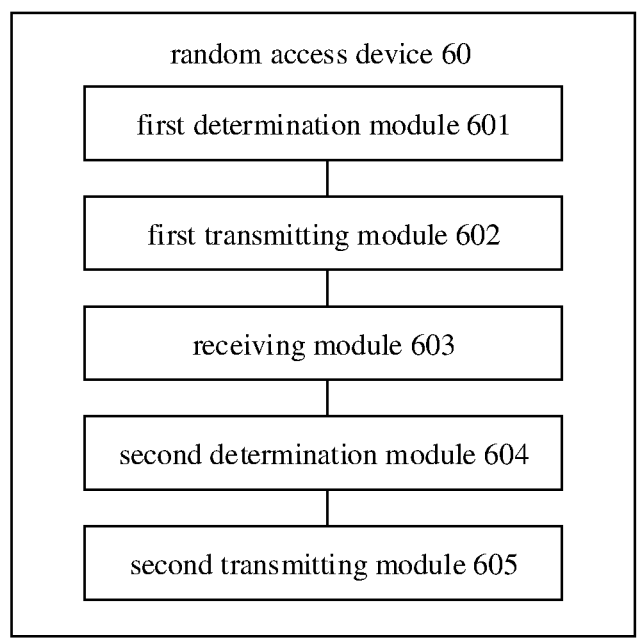
FIG. 6O is a structural schematic diagram illustrating a random access device according to an exemplary embodiment.

In an embodiment of the disclosure, as illustrated in FIG. 6O, the device 60 further includes a receiving module 603, a second determination module 604 and a second transmitting module 605.

The receiving module 603 is configured to receive random access response information from the target base station, the random access response information including a fifth carrier identifier.

The second determination module 604 is configured to determine a second target uplink carrier among the plurality of uplink carriers corresponding to the target base station according to the fifth carrier identifier.

The second transmitting module 605 is configured to transmit scheduled transmission information to the target base station using the second target uplink carrier.

The above embodiment of the disclosure is also suitable for the random access device 60 illustrated in FIG. 6A to FIG. 6N.

Figure 6P:
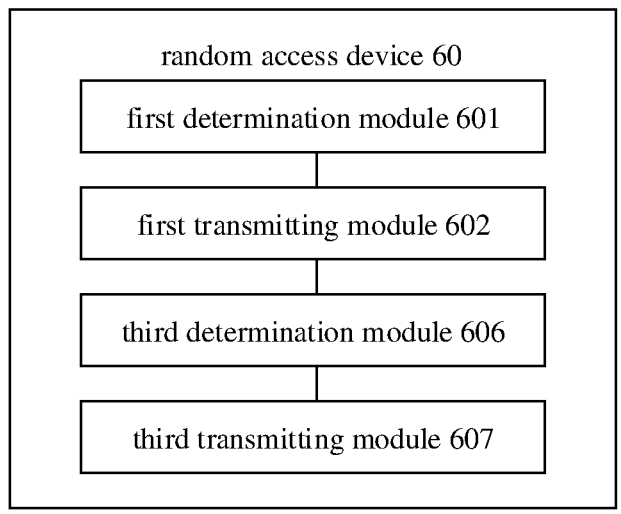
FIG. 6P is a structural schematic diagram illustrating a random access device according to an exemplary embodiment.

In an embodiment of the disclosure, as illustrated in FIG. 6P, the device 60 further includes a third determination module 606 and a third transmitting module 607.

The third determination module 606 is configured to determine a third target uplink carrier among the plurality of uplink carriers corresponding to the target base station if the random access response information is not received from the target base station in a second preset period.

The third transmitting module 607 is configured to transmit the random access preamble to the target base station using the third target uplink carrier.

The above embodiment of the disclosure is also suitable for the random access device 60 illustrated in FIG. 6A to FIG. 6N.

Figure 6Q:
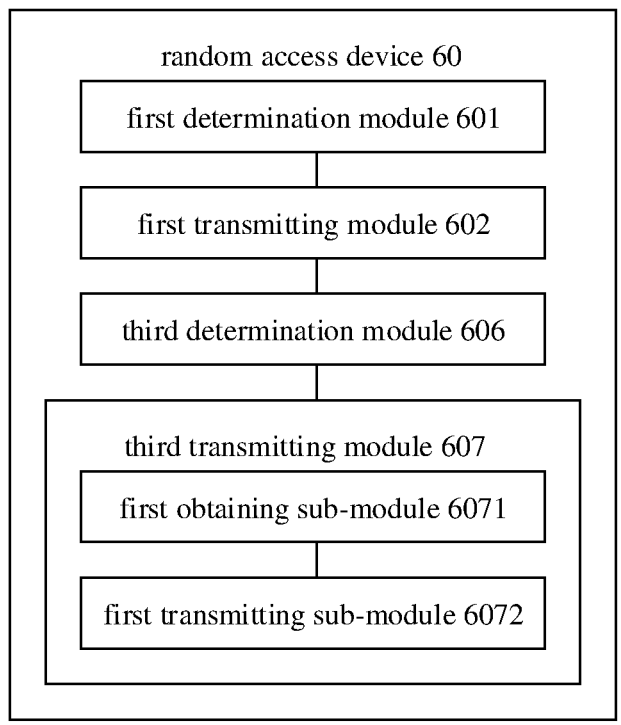
FIG. 6Q is a structural schematic diagram illustrating a random access device according to an exemplary embodiment.

In an embodiment of the disclosure, as illustrated in FIG. 6Q, the third transmitting module 607 includes a first obtaining sub-module 6071 and a first transmitting sub-module 6072.

The first obtaining sub-module 6071 is configured to obtain a transmitting power with which the random access preamble is transmitted to the target base station using the first target uplink carrier.

The first transmitting sub-module 6072 is configured to transmit the random access preamble to the target base station on the third target uplink carrier with the transmitting power.

A random access device is provided in the embodiments of the disclosure and the device can determine, among the plurality of uplink carriers corresponding to the target base station, the first target uplink carrier used for transmitting the random access preamble and transmit the random access preamble to the target base station using the first target uplink carrier to initiate a random access, so that the random access is implemented in cells configured with the SUL carrier, thus the success rate of the random access is increased.

Figure 7A:
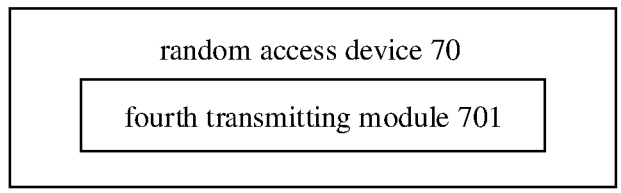
FIG. 7A is a structural schematic diagram illustrating a random access device according to an exemplary embodiment.

FIG. 7A is a block diagram illustrating a random access device 70 according to an exemplary embodiment and the device 70 can be implemented and become a part or all of an electrical device via software, hardware or a combination of the software and the hardware. According to FIG. 7A, the random access device 70 includes a fourth transmitting module 701.

The fourth transmitting module 701 is configured to transmit indication information to a terminal device, the indication information being configured to indicate a first target uplink carrier to be determined, by the terminal device for transmitting a random access preamble, among a plurality of uplink carriers corresponding to the base station, and the plurality of uplink carriers including at least one SUL carrier.

Figure 7B:
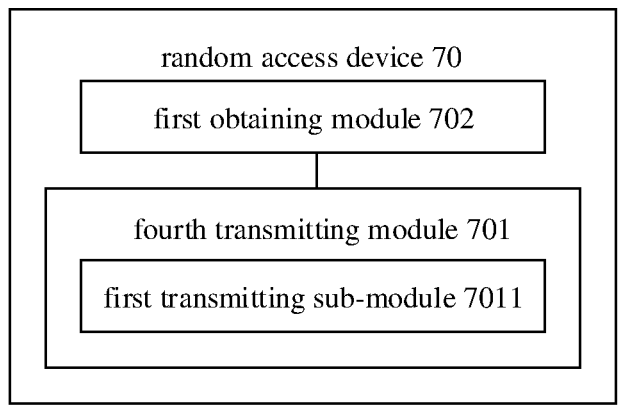
FIG. 7B is a structural schematic diagram illustrating a random access device according to an exemplary embodiment.

In an embodiment of the disclosure, as illustrated in FIG. 7B, the device 70 also includes a first obtaining module 702 and the fourth transmitting module includes a first transmitting sub-module 7011.

The first obtaining module 702 is configured to obtain the first target uplink carrier, configured for the terminal device to transmit the random access preamble, among the plurality of uplink carriers.

The first transmitting sub-module 7011 is configured to transmit a carrier identifier of the first target uplink carrier to the terminal device to enable the terminal device to determine the first target uplink carrier among the plurality of uplink carriers corresponding to the base station according to the carrier identifier of the first target uplink carrier.

Figure 7C:
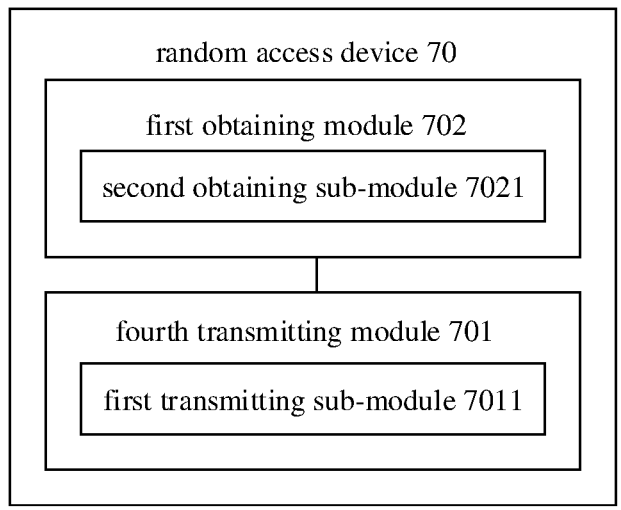
FIG. 7C is a structural schematic diagram illustrating a random access device according to an exemplary embodiment.

In an embodiment of the disclosure, as illustrated in FIG. 7C, the second obtaining sub-module 7021 is configured to obtain the first target uplink carrier configured for the terminal device to transmit the random access preamble according to a random access resource included by each of the plurality of uplink carriers.

Figure 7D:
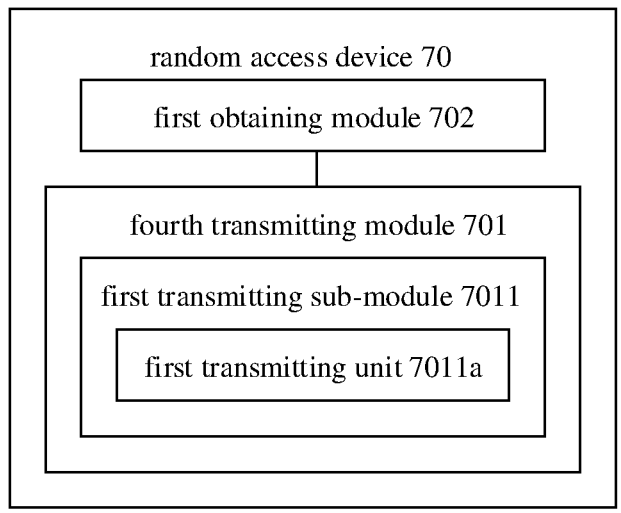
FIG. 7D is a structural schematic diagram illustrating a random access device according to an exemplary embodiment.

In an embodiment of the disclosure, as illustrated in FIG. 7D, the first transmitting sub-module 7011 includes a first transmitting unit 7011a configured to transmit an RRC message to the terminal device, the RRC message including the carrier identifier of the first target uplink carrier.

Figure 7E:
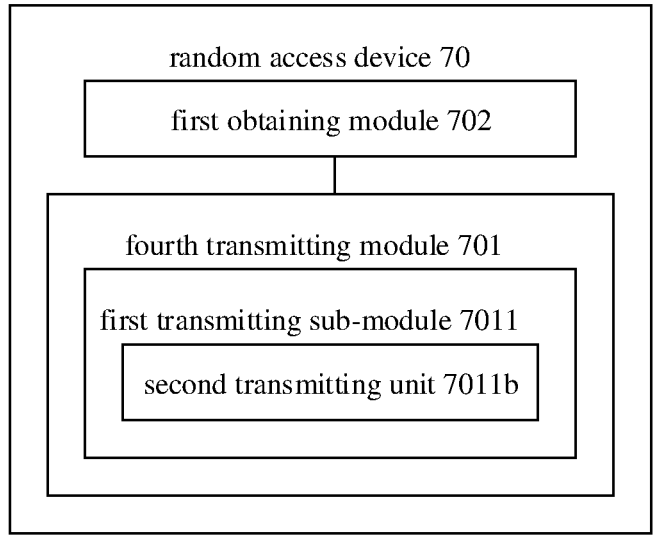
FIG. 7E is a structural schematic diagram illustrating a random access device according to an exemplary embodiment.

In an embodiment of the disclosure, as illustrated in FIG. 7E, the first transmitting sub-module 7011 includes a second transmitting unit 7011b configured to transmit allocation information of the random access preamble to the terminal device, the allocation information of the random access preamble including the carrier identifier of the first target uplink carrier.

Figure 7F:
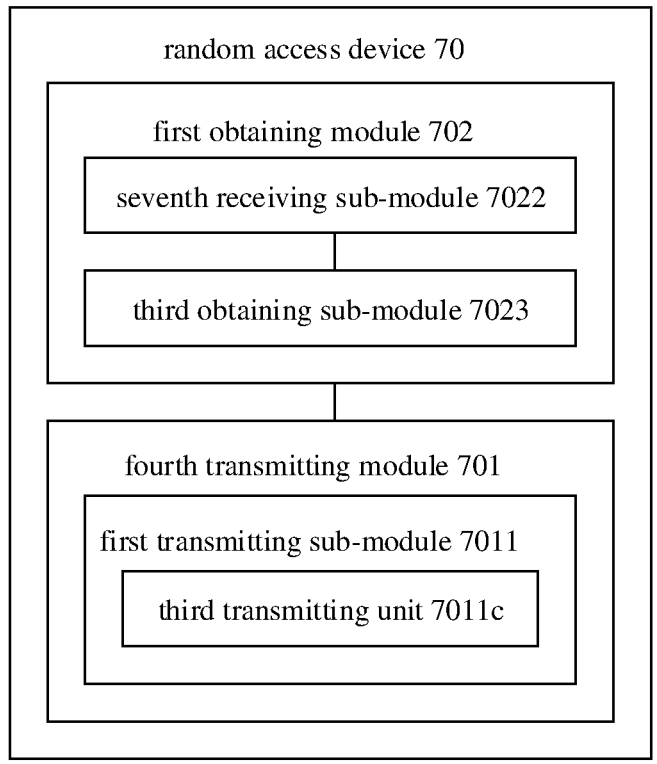
FIG. 7F is a structural schematic diagram illustrating a random access device according to an exemplary embodiment.

In an embodiment of the disclosure, as illustrated in FIG. 7F, the first obtaining module 702 includes a seventh receiving sub-module 7022 and a third obtaining sub-module 7023; and the first transmitting sub-module 7011 includes a third transmitting unit 7011c.

The seventh receiving sub-module 7022 is configured to receive a handover request from an original base station, the handover request indicating that the terminal device performs a handover from the original base station to the base station.

The third obtaining sub-module 7023 is configured to obtain the first target uplink carrier, configured for the terminal device to transmit the random access preamble, among the plurality of uplink carriers according to the handover request.

The third transmitting unit 7011c is configured to transmit handover response information to the original base station, the handover response information including the carrier identifier of the first target uplink carrier to enable the original base station to transmit handover command information including the carrier identifier of the first target uplink carrier to the terminal device.

Figure 7G:
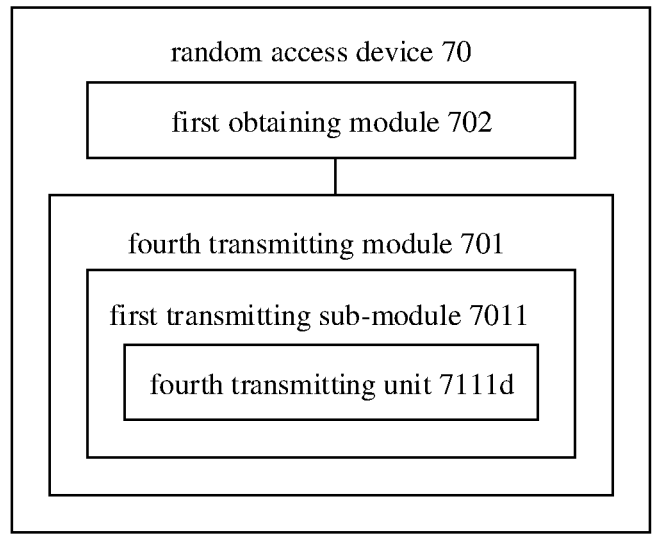
FIG. 7G is a structural schematic diagram illustrating a random access device according to an exemplary embodiment.

In an embodiment of the disclosure, as illustrated in FIG. 7G, the first transmitting sub-module 7011 includes a fourth transmitting unit 7111d. The fourth transmitting unit 7111d is configured to transmit reconfiguration information to the terminal device after the base station re-establishes an SCG or modifies the SCG, the reconfiguration information including the carrier identifier of the first target uplink carrier.

Figure 7H:
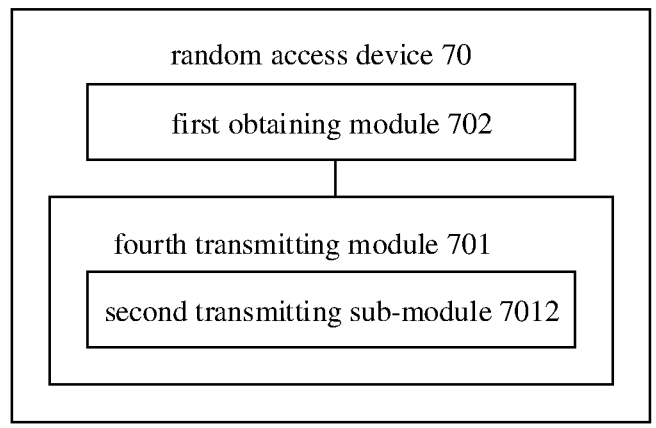
FIG. 7H is a structural schematic diagram illustrating a random access device according to an exemplary embodiment.

In an embodiment of the disclosure, as illustrated in FIG. 7H, the fourth transmitting module includes a second transmitting sub-module 7012. The second transmitting sub-module 7012 is configured to transmit a power threshold to the terminal device to enable the terminal device to determine the first target uplink carrier for transmitting the random access preamble, among the plurality of uplink carriers corresponding to the base station, according to the power threshold and an RSRP of a current downlink carrier.

Figure 7I:
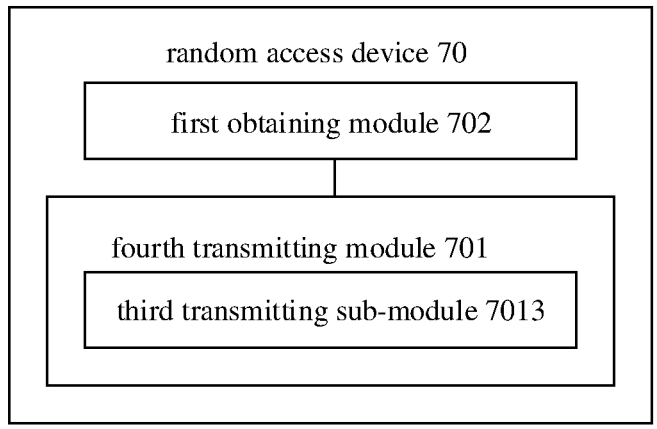
FIG. 7I is a structural schematic diagram illustrating a random access device according to an exemplary embodiment.

In an embodiment of the disclosure, as illustrated in FIG. 7I, the fourth transmitting module 701 includes a third transmitting sub-module 7013 configured to transmit a quality threshold to the terminal device to enable the terminal device to determine the first target uplink carrier for transmitting the random access preamble, among the plurality of uplink carriers corresponding to the base station, according to the quality threshold and an RSRQ of a current downlink carrier.

Figure 7J:
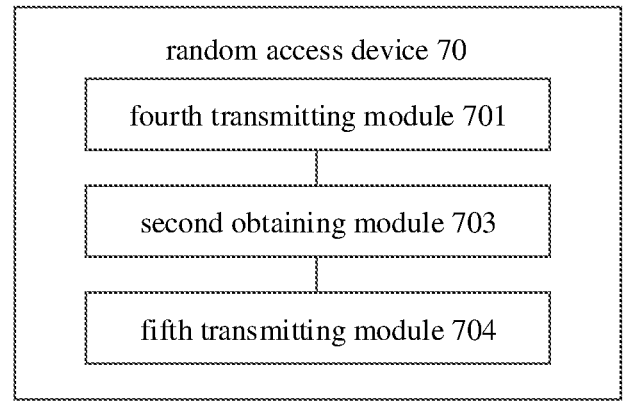
FIG. 7J is a structural schematic diagram illustrating a random access device according to an exemplary embodiment.

In an embodiment of the disclosure, as illustrated in FIG. 7J, the device 70 further includes a second obtaining module 703 and a fifth transmitting module 704.

The second obtaining module 703 is configured to obtain the second target uplink carrier, configured for the terminal device to transmit scheduled transmission information, among the plurality of uplink carriers according to the random access preamble transmitted by the terminal device.

The fifth transmitting module 704 is configured to transmit random access response information to the terminal device, the random access response information including the carrier identifier of the second target uplink carrier.

The above embodiment of the disclosure is also suitable for the random access device 70 illustrated in FIG. 7A to FIG. 7I.

A random access device is provided in the embodiments of the disclosure and the device can determine, among the plurality of uplink carriers, the first target uplink carrier for transmitting the random access preamble and transmit the random access preamble to the target base station using the first target uplink carrier, so that the random access is implemented in cells configured with the SUL carrier, thus the success rate of the random access is increased.

The embodiments of the disclosure further provide a random access device which includes:
a first processor;
a first memory configured to store instructions executable by the first processor;
The first processor is configured to:
determine a first target uplink carrier among a plurality of uplink carriers corresponding to a target base station, the plurality of uplink carriers including at least one SUL carrier; and
transmit a random access preamble to the target base station using the first target uplink carrier.

In an embodiment of the disclosure, the above first processor is also configured to receive a carrier identifier of the first target uplink carrier from the base station and determine the first target uplink carrier among the plurality of uplink carriers corresponding to the target base station according to the carrier identifier of the first target uplink carrier.

In an embodiment of the disclosure, the above first processor is also configured to receive an RRC message including the carrier identifier of the first target uplink carrier from the target base station.

In an embodiment of the disclosure, the above first processor is also configured to receive allocation information of the random access preamble from the target base station, the random access preamble including the carrier identifier of the first target uplink carrier.

In an embodiment of the disclosure, the above first processor is also configured to receive handover command information from an original base station when the terminal device performs handover between the original base station and the target base station, the handover command information including the carrier identifier of the first target uplink carrier.

In an embodiment of the disclosure, the above first processor is also configured to receive a reconfiguration message from the target base station after the target base station re-establishes an SCG or modifies the SCG, the reconfiguration message including the carrier identifier of the first target uplink carrier.

In an embodiment of the disclosure, the above first processor is also configured to receive an RRC message including a power threshold from the target base station, detect an RSRP of a current downlink carrier and determine the first target uplink carrier among the plurality of uplink carriers corresponding to the target base station, according to the RSRP and the power threshold.

In an embodiment of the disclosure, the plurality of uplink carriers include one SUL carrier and one non-SUL carrier; the above first processor is also configured to determine the non-SUL carrier as the first target uplink carrier in response to the RSRP being greater than or equal to the power threshold, and determine the SUL carrier as the first target uplink carrier in response to the RSRP being less than the power threshold.

In an embodiment of the disclosure, the above first processor is also configured to receive an RRC message including a quality threshold from the target base station, detect the RSRQ of the current downlink carrier and determine the first target uplink carrier among the plurality of uplink carriers corresponding to the target base station, according to the RSRQ and the quality threshold.

In an embodiment of the disclosure, the plurality of uplink carriers include one SUL carrier and one non-SUL carrier; the above first processor is also configured to determine the non-SUL carrier as the first target uplink carrier in response to the RSRQ being greater than or equal to the quality threshold, and determine the SUL carrier as the first target uplink carrier in response to the RSRQ being less than the quality threshold.

In an embodiment of the disclosure, the above first processor is also configured to receive, from the target base station, an RRC message including the power threshold and the quality threshold, detect the RSRP and the RSRQ of the current downlink carrier and determine the first target uplink carrier among the plurality of uplink carriers corresponding to the target base station according to the RSRP and the power threshold as well as the RSRQ and the quality threshold.

In an embodiment of the disclosure, the plurality of uplink carriers include one SUL carrier and one non-SUL carrier; the above first processor is also configured to determine the non-SUL carrier as the first target uplink carrier when the RSRP is greater than or equal to the power threshold, or the RSRQ is greater than or equal to the quality threshold; and determine the SUL carrier as the first target uplink carrier when the RSRP is less than the power threshold and the RSRQ is less than the quality threshold.

In an embodiment of the disclosure, the above first processor is also configured to determine, as the first target uplink carrier, a carrier configured with a PUCCH among the plurality of uplink carriers.

In an embodiment of the disclosure, the above first processor is also configured to determine the first target uplink carrier according to a random access resource included by each of the plurality of uplink carriers.

In an embodiment of the disclosure, the above first processor is also configured to receive, from the target base station, random access response information including the carrier identifier of a second target uplink carrier, determine, according to the carrier identifier of the second target uplink carrier, the second target uplink carrier among the plurality of uplink carriers corresponding to the target base station and transmit scheduled transmission information to the target base station using the second target uplink carrier.

In an embodiment of the disclosure, the above first processor is also configured to determine a third target uplink carrier among the plurality of uplink carriers corresponding to the target base station if the random access response information is not received from the target base station in a second preset period and transmit the random access preamble to the target base station using the third target uplink carrier.

In an embodiment of the disclosure, the above first processor is also configured to obtain a transmitting power with which the random access preamble is transmitted to the target base station using the first target uplink carrier and transmit the random access preamble to the target base station on the third target uplink carrier with the transmitting power.

A random access device is provided in the embodiments of the disclosure and the device can determine, among the plurality of uplink carriers corresponding to the target base station, the first target uplink carrier used for transmitting the random access preamble and transmit the random access preamble to the target base station using the first target uplink carrier to initiate a random access, so that the random access is implemented in cells configured with the SUL carrier, thus the success rate of the random access is increased.

The embodiments of the disclosure further provide a random access device which includes:
- a second processor;
- a second memory configured to store instructions executable by the second processor;
- The second processor is configured to:
  - transmit indication information to a terminal device, the indication information being configured to indicate a first target uplink carrier to be determined, by the terminal device for transmitting a random access preamble, among a plurality of uplink carriers corresponding to a base station, and the plurality of uplink carriers including at least one SUL carrier.

In an embodiment of the disclosure, the above second processor is also configured to obtain the first target uplink carrier, configured for the terminal device to transmit the random access preamble, among the plurality of uplink carriers and transmit a carrier identifier of the first target uplink carrier to the terminal device to enable the terminal device to determine the first target uplink carrier among the plurality of uplink carriers corresponding to the base station according to the carrier identifier of the first target uplink carrier.

In an embodiment of the disclosure, the above second processor is also configured to obtain the first target uplink carrier configured for the terminal device to transmit the random access preamble according to a random access resource included by each of the plurality of uplink carriers.

In an embodiment of the disclosure, the above second processor is also configured to transmit an RRC message including the carrier identifier of the first target uplink carrier to the terminal device.

In an embodiment of the disclosure, the above second processor is also configured to transmit allocation information of the random access preamble to the terminal device, the allocation information of the random access preamble including the carrier identifier of the first target uplink carrier.

In an embodiment of the disclosure, the above second processor is also configured to receive a handover request, which indicates that the terminal device performs a handover from the original base station to the base station, from an original base station, obtain the first target uplink carrier, configured for the terminal device to transmit the random access preamble, among the plurality of uplink carriers according to the handover request and transmit handover response information to the original base station, the handover response information including the carrier identifier of the first target uplink carrier to enable the original base station to transmit handover command information including the carrier identifier of the first target uplink carrier to the terminal device.

In an embodiment of the disclosure, the above second processor is also configured to transmit reconfiguration information to the terminal device after the base station re-establishes an SCG or modifies the SCG and the reconfiguration information including the carrier identifier of the first target uplink carrier.

In an embodiment of the disclosure, the above second processor is also configured to transmit a power threshold to the terminal device to enable the terminal device to determine the first target uplink carrier for transmitting the random access preamble, among the plurality of uplink carriers corresponding to the base station, according to the power threshold and an RSRP of a current downlink carrier.

In an embodiment of the disclosure, the above second processor is also configured to transmit a quality threshold to the terminal device to enable the terminal device to determine the first target uplink carrier for transmitting the random access preamble, among the plurality of uplink carriers corresponding to the base station, according to the quality threshold and an RSRQ of a current downlink carrier.

In an embodiment of the disclosure, the above second processor is also configured to obtain the second target uplink carrier, configured for the terminal device to transmit scheduled transmission information, among the plurality of uplink carriers according to the random access preamble transmitted by the terminal device.

A random access device is provided in the embodiments of the disclosure and the device can determine, among the plurality of uplink carriers, the first target uplink carrier for transmitting the random access preamble and transmit the random access preamble to the target base station using the first target uplink carrier, so that the random access is implemented in cells configured with the SUL carrier, thus the success rate of the random access is increased.

As to the device according to the above embodiments, detailed operations performed by respective modules in the device are already described in detailed in the embodiments related to the method, and will not be elaborated herein.

Figure 8:
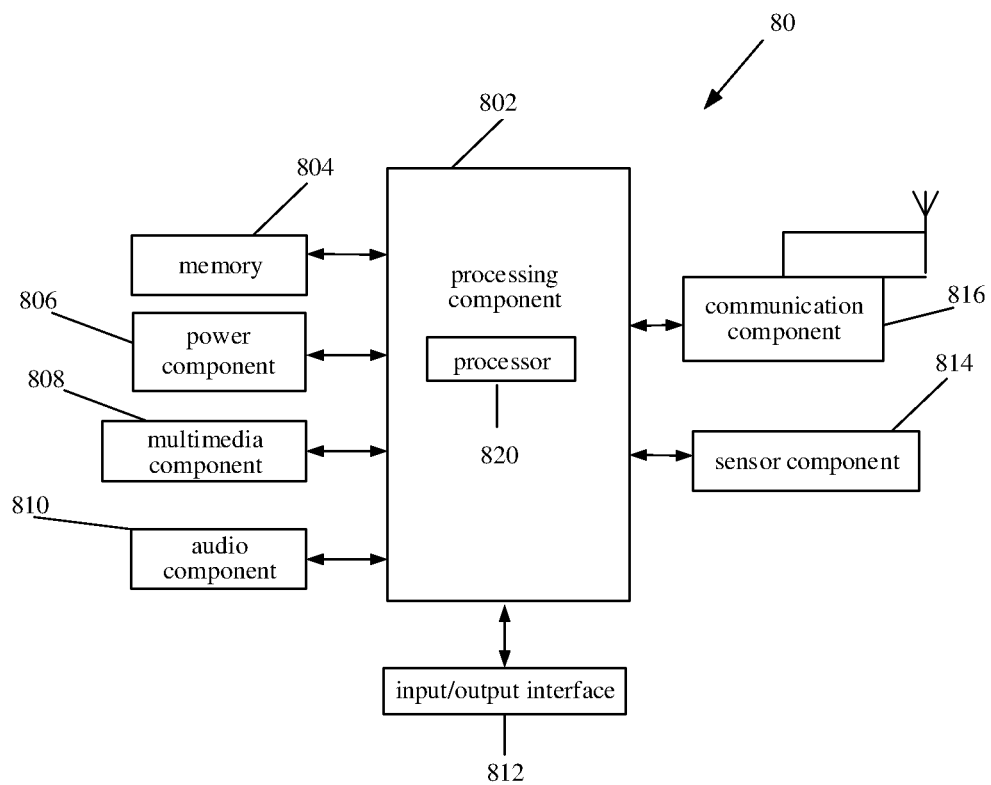
FIG. 8 is a structural block diagram illustrating a random access device according to an exemplary embodiment.

FIG. 8 is a structural block diagram illustrating a random access device 80 according to an exemplary embodiment. For example, the device 80 may be a mobile phone, a computer, a digital broadcast terminal, a messaging device, a gaming console, a tablet, a medical device, exercise equipment and a personal digital assistant and so on.

The device 80 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 80, such as the operations associated with display, telephone calls, data communications, camera operations, and recording operations. The processing component 802 may include one or more processors 820 to execute instructions to perform all or part of the operations in the above-mentioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 80. Examples of such data include instructions for any application programs or methods operated on the device 80, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 80. The power component 806 may include a power management system, one or more power supplies, and other components associated with generation, management and distribution of power for the device 80.

The multimedia component 808 includes a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 80 is in an operation mode, such as a photographing mode or a video mode. The front camera and/or the rear camera may receive external multimedia data when the device 80 is in an operation mode, such as a photographing mode or a video mode.

The audio component 810 is configured to output and/or input an audio signal. For example, the audio component 810 includes a Microphone (MIC), and the MIC is configured to receive an external audio signal when the device 80 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 80. For instance, the sensor component 814 may detect an on/off status of the device 80 and relative positioning of components, such as a display and small keyboard of the device 80, and the sensor component 814 may further detect a change in a position of the device 80 or a component of the device 80, presence or absence of contact between the user and the device 80, orientation or acceleration/deceleration of the device 1100 and a change in temperature of the device 80. he sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 may be a transceiver, and is configured to facilitate wired or wireless communication between the device 80 and another device. The device 80 may access a communication-standard-based wireless network, such as a Wireless Fidelity (WiFi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 804 including an instruction, and the instruction may be executed by the processor 820 of the device 80 to implement the abovementioned method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 9:
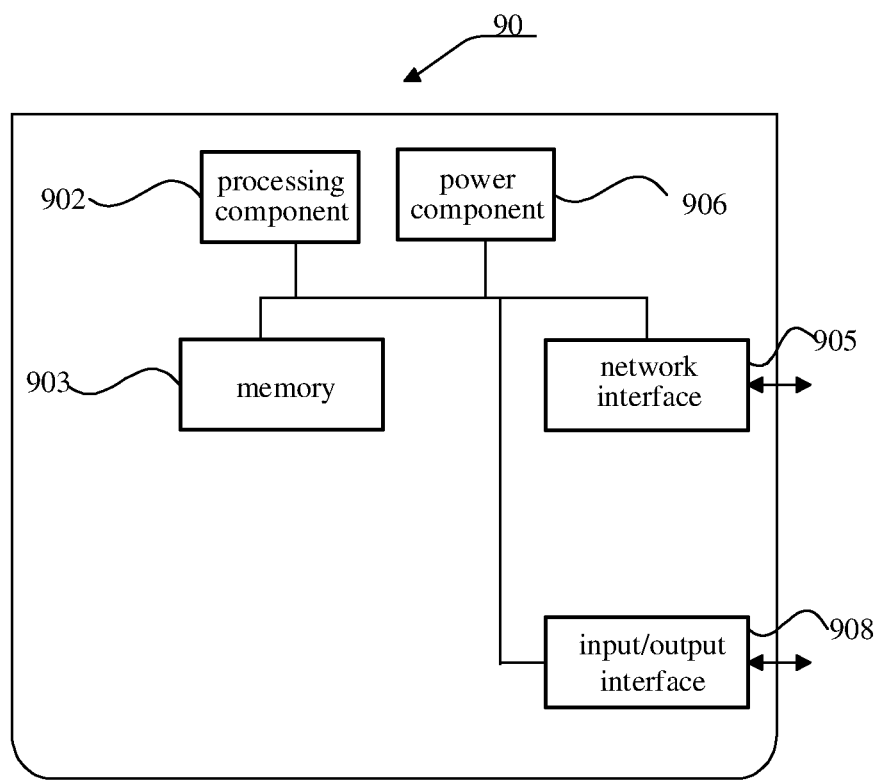
FIG. 9 is a structural block diagram illustrating a random access device according to an exemplary embodiment.

FIG. 9 is a structural block diagram illustrating a random access device 90 according to an exemplary embodiment. For example, the device 90 may be provided as a server that is applied to a base station. The device 90 includes a processing component 902 and further includes one or more processors and a memory resource represented by a memory 902, which stores instructions (such as an application) executable by the processing component 902. The applications stored in the memory 903 may include one or more modules, each of which corresponds to a group of instructions. Moreover, the processing component 902 is configured to execute the instructions to perform the above methods.

The device 90 may further include a power component 906, which is configured to conduct power management of the device 90, one wired or wireless network interface 905, which is configured to connect the device 90 to a network and one I/O interface 908. The device 90 can operate an operation system stored in the memory 903, such as Windows Server™, Mac OS X™, Unix™, Linux™, FreeBSD™ and the like.

A non-transitory computer readable storage medium is provided in the embodiments of the disclosure. When instructions in the storage medium is executed by the processor of the device 80, the device 80 can execute the above random access method at the terminal device side. The method includes the following operations.

A first target uplink carrier is determined among a plurality of uplink carriers corresponding to a target base station, the plurality of uplink carriers including at least one SUL carrier.

A random access preamble is transmitted to the target base station using the first target uplink carrier.

In an embodiment of the disclosure, determining the first target uplink carrier among the plurality of uplink carriers corresponding to the target base station includes the following operations: a carrier identifier of the first target uplink carrier is received from the target base station; and the first target uplink carrier is determined among the plurality of uplink carriers corresponding to the target base station according to the carrier identifier of the first target uplink carrier.

In an embodiment of the disclosure, receiving the carrier identifier of the first target uplink carrier from the base station includes the following operation: an RRC message, which is the carrier identifier of the first target uplink carrier, is received from the target base station.

In an embodiment of the disclosure, receiving the carrier identifier of the first target uplink carrier from the base station includes the following operation: allocation information of the random access preamble is received from the target base station, the allocation information of the random access preamble including the carrier identifier of the first target uplink carrier.

In an embodiment of the disclosure, receiving the carrier identifier of the first target uplink carrier from the base station includes the following operation: handover command information from an original base station is received when the terminal device performs handover between the original base station and the target base station, the handover command information including the carrier identifier of the first target uplink carrier.

In an embodiment of the disclosure, receiving the carrier identifier of the first target uplink carrier from the base station includes the following operation: reconfiguration information is received from the target base station after the target base station re-establishes an SCG or modifies the SCG, the reconfiguration information including the carrier identifier of the first target uplink carrier.

In an embodiment of the disclosure, determining the first target uplink carrier among the plurality of uplink carriers corresponding to the target base station includes the following operations: an RRC message including a power threshold is received from the target base station; an RSRP of a current downlink carrier is detected; and the first target uplink carrier is determined among the plurality of uplink carriers corresponding to the target base station according to the RSRP and the power threshold.

In an embodiment of the disclosure, the plurality of uplink carriers includes one SUL carrier and one non-SUL carrier; determining the first target uplink carrier among the plurality of uplink carriers corresponding to the target base station according to the RSRP and the power threshold includes the following operations: the non-SUL carrier is determined as the first target uplink carrier in response to the RSRP being greater than or equal to the power threshold; and the SUL carrier is determined as the first target uplink carrier in response to the RSRP being less than the power threshold.

In an embodiment of the disclosure, determining the first target uplink carrier among the plurality of uplink carriers corresponding to the target base station includes the following operations: an RRC message including a quality threshold is received from the target base station; an RSRQ of the current downlink carrier is detected; and the first target uplink carrier is determined among the plurality of uplink carriers corresponding to the target base station according to the RSRQ and the quality threshold.

In an embodiment of the disclosure, the plurality of uplink carriers includes one SUL carrier and one non-SUL carrier; determining the first target uplink carrier among the plurality of uplink carriers corresponding to the target base station according to the RSRQ and the quality threshold includes the following operations: the non-SUL carrier is determined as the first target uplink carrier in response to the RSRQ being greater than or equal to the quality threshold; and the SUL carrier is determined as the first target uplink carrier in response to the RSRQ being less than the quality threshold.

In an embodiment of the disclosure, determining the first target uplink carrier among the plurality of uplink carriers corresponding to the target base station includes the following operations: an RRC message including the power threshold and the quality threshold is received from the target base station; the RSRP and the RSRQ of the current downlink carrier is detected; and the first target uplink carrier is determined among the plurality of uplink carriers corresponding to the target base station according to the RSRP and the power threshold as well as the RSRQ and the quality threshold.

In an embodiment of the disclosure, the plurality of uplink carriers includes one SUL carrier and one non-SUL carrier; determining the first target uplink carrier among the plurality of uplink carriers corresponding to the target base station according to the RSRP and the power threshold as well as the RSRQ and the quality threshold includes the following operations: the non-SUL carrier is determined as the first target uplink carrier in response to the RSRP being greater than or equal to the power threshold, or in response to the RSRQ being greater than or equal to the quality threshold; and the SUL carrier is determined as first target uplink carrier in response to the RSRP being less than the power threshold and the RSRQ being less than the quality threshold.

In an embodiment of the disclosure, determining the first target uplink carrier among the plurality of uplink carriers corresponding to the target base station includes the following operation: a carrier configured with a PUCCH among the plurality of uplink carriers is determined as the first target uplink carrier.

In an embodiment of the disclosure, determining the first target uplink carrier among the plurality of uplink carriers corresponding to the target base station includes the following operation: the first target uplink carrier is determined according to a random access resource included in each of the plurality of uplink carriers.

In an embodiment of the disclosure, the method further includes the following operations: random access response information is received from the target base station, the random access response information including the carrier identifier of a second target uplink carrier; the second target uplink carrier is determined among the plurality of uplink carriers corresponding to the target base station according to the carrier identifier of the second target uplink carrier; and scheduled transmission information is transmitted to the target base station using the second target uplink carrier.

In an embodiment of the disclosure, the method further includes the following operations: a third target uplink carrier is determined among the plurality of uplink carriers corresponding to the target base station if random access response information is not received from the target base station in a second preset period; and the random access preamble is transmitted to the target base station using the third target uplink carrier.

In an embodiment of the disclosure, transmitting the random access preamble to the target base station using the third target uplink carrier includes the following operations: a transmitting power, with which the random access preamble is transmitted to the target base station, is obtained using the first target uplink carrier; and the random access preamble is transmitted to the target base station on the third target uplink carrier with the transmitting power.

A non-transitory computer readable storage medium is provided in the embodiments of the disclosure. When instructions in the storage medium is executed by the processor of the device 90, the device 90 can execute the above random access method at the base station side. The method includes the following operation.

Indication information is transmitted to a terminal device, the indication information being configured to indicate a first target uplink carrier to be determined, by the terminal device for transmitting a random access preamble, among a plurality of uplink carriers corresponding to the base station, and the plurality of uplink carriers including at least one SUL carrier.

In an embodiment of the disclosure, the method further includes the following operation: the first target uplink carrier configured for the terminal device to transmit the random access preamble is obtained among the plurality of uplink carriers; transmitting the indication information to the terminal device includes the following operation: a carrier identifier of the first target uplink carrier is transmitted to the terminal device to enable the terminal device to determine, according to the carrier identifier of the first target uplink carrier, the first target uplink carrier among the plurality of uplink carriers corresponding to the base station.

In an embodiment of the disclosure, obtaining, among the plurality of uplink carriers, the first target uplink carrier configured for the terminal device to transmit the random access preamble includes the following operation: the first target uplink carrier configured for the terminal device to transmit the random access preamble is obtained according to a random access resource included in each of the plurality of uplink carriers.

In an embodiment of the disclosure, transmitting the carrier identifier of the first target uplink carrier to the terminal device includes: an RRC message including the carrier identifier of the first target uplink carrier is transmitted to the terminal device.

In an embodiment of the disclosure, transmitting the carrier identifier of the first target uplink carrier to the terminal device includes: allocation information of the random access preamble is transmitted to the terminal device, the allocation information of the random access preamble including the carrier identifier of the first target uplink carrier.

In an embodiment of the disclosure, obtaining, among the plurality of uplink carriers, the first target uplink carrier configured for the terminal device to transmit the random access preamble includes the following operations: a handover request, which indicates that the terminal device performs handover from the original base station to the base station, is received from an original base station; the first target uplink carrier configured for the terminal device to transmit the random access preamble is obtained among the plurality of uplink carriers according to the handover request; transmitting the carrier identifier of the first target uplink carrier to the terminal device includes the following operation: handover response information is transmitted to the original base station, the handover response information including the carrier identifier of the first target uplink carrier to enable the original base station to transmit, to the terminal device, handover command information including the carrier identifier of the first target uplink carrier.

In an embodiment of the disclosure, transmitting the carrier identifier of the first target uplink carrier to the terminal device includes the following operation: reconfiguration information is transmitted to the terminal device after the base station re-establishes an SCG or modifies the SCG, the reconfiguration information including the carrier identifier of the first target uplink carrier.

In an embodiment of the disclosure, transmitting the indication information to the terminal device includes the following operation: a power threshold is transmitted to the terminal device to enable the terminal device to determine, according to the power threshold and an RSRP of a current downlink carrier, the first target uplink carrier for transmitting the random access preamble among the plurality of uplink carriers corresponding to the base station.

In an embodiment of the disclosure, transmitting the indication information to the terminal device includes the following operation: a quality threshold is transmitted to the terminal device to enable the terminal device to determine, according to the quality threshold and an RSRQ of the current downlink carrier, the first target uplink carrier for transmitting the random access preamble among the plurality of uplink carriers corresponding to the base station.

In an embodiment of the disclosure, the method further includes: a second target uplink carrier configured for the terminal device to transmit scheduled transmission information is obtained among the plurality of uplink carriers according to the random access preamble transmitted by the terminal device; random access response information is transmitted to the terminal device, the random access response information including the carrier identifier of the second target uplink carrier.

Other implementation solutions of the present disclosure will be apparent to those skilled in the art from consideration of the specification and practice of the present disclosure. The present application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A random access method, comprising:
receiving, by a terminal, a carrier identifier of a first uplink carrier sent by a base station;
determining, by the terminal, the first uplink carrier among a plurality of uplink carriers corresponding to the base station according to the carrier identifier of the first uplink carrier; and
transmitting, by the terminal, a random access preamble to the base station using the first uplink carrier;
wherein the plurality of uplink carriers comprise a supplementary uplink (SUL) carrier and a non-SUL carrier, and wherein receiving the carrier identifier of the first uplink carrier sent by the base station comprises:

receiving, by the terminal, handover command information, the handover command information comprising the carrier identifier of the first uplink carrier.

2. The method according to claim 1, further comprising:
receiving, by the terminal, a radio resource control (RRC) message sent by the base station, wherein the RRC message comprises the carrier identifier of the first uplink carrier.

3. The method according to claim 1, further comprising:
receiving, by the terminal, reconfiguration information from the base station after the base station re-establishes a secondary cell group (SCG) or modifies the SCG, the reconfiguration information comprising the carrier identifier of the first uplink carrier.

4. The method according to claim 1, further comprising:
receiving, by the terminal, a physical downlink control channel (PDCCH) command sent by the base station, the PDCCH command comprising the carrier identifier of the first uplink carrier.

5. A non-transitory computer-readable storage medium having stored thereon instructions that, when executed by a processor of a terminal device, cause the terminal device to perform the method of claim 1.

6. The method according to claim 1, further comprising:
receiving, by the terminal, a radio resource control (RRC) message sent by the base station, the RRC message comprising a power threshold;
detecting, by the terminal, a reference signal received power (RSRP) of a current downlink carrier; and
determining, by the terminal, the first uplink carrier among the plurality of uplink carriers according to the RSRP and the power threshold.

7. A random access method, comprising:
transmitting, by a base station, a carrier identifier of a first uplink carrier; and
receiving, by the base station, a random access preamble sent by a terminal using the first uplink carrier determined by the terminal among a plurality of uplink carriers corresponding to the base station according to the carrier identifier of the first uplink carrier;
wherein the plurality of uplink carriers comprise a supplementary uplink (SUL) carrier and a non-SUL carrier, and the base station is a target base station, and transmitting the carrier identifier of the first uplink carrier comprises:
receiving a handover request from an original base station;
generating handover request response information comprising the carrier identifier of the first uplink carrier; and
transmitting the handover request response information comprising the carrier identifier of the first uplink carrier to the original base station.

8. The method according to claim 7, further comprising:
transmitting, by the base station, a radio resource control (RRC) message to the terminal, wherein the RRC message comprises the carrier identifier of the first uplink carrier.

9. The method according to claim 7, further comprising:
re-establishing or modifying, by the base station, a secondary cell group (SCG); and
transmitting, by the base station, reconfiguration information to the terminal, the reconfiguration information comprising the carrier identifier of the first uplink carrier.

10. The method according to claim 7, further comprising:
transmitting, by the base station, a physical downlink control channel (PDCCH) command to the terminal, the PDCCH command comprising the carrier identifier of the first uplink carrier.

11. A base station, comprising:
a processor; and
a memory configured to store instructions executable by the processor;
wherein the processor is configured to perform the method of claim 7.

12. A non-transitory computer-readable storage medium having stored thereon instructions that, when executed by a processor of a base station, cause the base station to perform the method of claim 7.

13. The method according to claim 7, further comprising:
transmitting, by the base station, a radio resource control (RRC) message to the terminal, the RRC message comprising a power threshold; wherein
the first uplink carrier is further determined by the terminal among the plurality of uplink carriers according to a reference signal received power (RSRP) of a current downlink carrier and the power threshold.

14. A terminal device, comprising:
a processor; and
a memory configured to store instructions executable by the processor;
wherein the processor is configured to:
receive a carrier identifier of a first uplink carrier sent by a base station;
determine the first uplink carrier among a plurality of uplink carriers corresponding to the base station according to the carrier identifier of the first uplink carrier, the plurality of uplink carriers comprising a supplementary uplink (SUL) carrier and a non-SUL carrier;
transmit a random access preamble to the base station using the first uplink carrier; and
receive handover command information, the handover command information comprising the carrier identifier of the first uplink carrier.

15. The terminal device according to claim 14, wherein the processor is further configured to:
receive a radio resource control (RRC) message sent by the base station, wherein the RRC message comprises the carrier identifier of the first uplink carrier.

16. The terminal device according to claim 14, wherein the processor is further configured to:
receive reconfiguration information from the base station after the base station re-establishes a secondary cell group (SCG) or modifies the SCG, the reconfiguration information comprising the carrier identifier of the first uplink carrier.

17. The terminal device according to claim 14, wherein the processor is further configured to:
receive a physical downlink control channel (PDCCH) command sent by the base station, the PDCCH command comprising the carrier identifier of the first uplink carrier.

18. The terminal device according to claim 14, wherein the processor is further configured to:
receive a radio resource control (RRC) message sent by the base station, the RRC message comprising a power threshold;
detect a reference signal received power (RSRP) of a current downlink carrier; and determine the first uplink carrier among the plurality of uplink carriers according to the RSRP and the power threshold.

* * * * *